United States Patent
Hirota et al.

(10) Patent No.: US 6,783,110 B2
(45) Date of Patent: Aug. 31, 2004

(54) PROPORTIONAL SOLENOID VALVE

(75) Inventors: Hisatoshi Hirota, Tokyo (JP); Tokumi Tsugawa, Tokyo (JP); Katsumi Koyama, Tokyo (JP); Toshiyuki Shiota, Tokyo (JP); Yuusuke Inoue, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 85 days.

(21) Appl. No.: 10/308,211

(22) Filed: Dec. 2, 2002

(65) Prior Publication Data
US 2003/0146402 A1 Aug. 7, 2003

(30) Foreign Application Priority Data
Dec. 3, 2001 (JP) .......................................... 2001-368486

(51) Int. Cl.[7] .............................................. F16K 31/02
(52) U.S. Cl. ............................. 251/129.21; 251/129.08
(58) Field of Search ........................ 251/129.08, 129.15, 251/129.21

(56) References Cited

U.S. PATENT DOCUMENTS

| | | | |
|---|---|---|---|
| 4,339,109 A | | 7/1982 | Kawata et al. |
| 4,934,329 A | * | 6/1990 | Lear et al. .................. 123/531 |
| 5,460,349 A | | 10/1995 | Campbell et al. |
| 5,897,098 A | | 4/1999 | Nishinosono et al. |
| 6,302,337 B1 | * | 10/2001 | Kimmel ....................... 239/408 |

FOREIGN PATENT DOCUMENTS

EP          0 339 339 A2     11/1989

\* cited by examiner

Primary Examiner—Edward K. Look
Assistant Examiner—John K. Fristoe, Jr.
(74) Attorney, Agent, or Firm—Patterson, Thuente, Skaar & Christensen, P.A.

(57) ABSTRACT

To provide a small-sized and low-cost proportional solenoid valve which is capable of controlling a bidirectional fluid flow. A core is fixed in a pipe, and a hollow shaft having an extreme end thereof closed by a valve seat and a portion adjacent thereto formed with valve holes is fixed in the core. Within the pipe, there are arranged a hollow cylindrical valve element axially movable using the shaft as a guide and urged in a direction away from the core by a spring, for opening and closing the valve holes, and a plunger, while outside the pipe, there is arranged a solenoid coil. The proportional solenoid valve has a body formed by the pipe, and the component parts for opening and closing the valve are arranged within the pipe, so that it is possible to reduce the size of the proportional solenoid valve, the number of component parts, and machining costs and material costs, which contributes to reduction of costs of the valve. Further, since the operation of the hollow cylindrical valve element for opening and closing the valve holes is not adversely affected by the direction of the fluid flow, it is possible to control a bidirectional flow of fluid.

20 Claims, 25 Drawing Sheets

PROPORTIONAL SOLENOID VALVE

BACKGROUND OF THE INVENTION

(1) Field of the Invention

This invention relates to a proportional solenoid valve, and more particularly to a proportional solenoid valve having a valve lift thereof continuously changed in accordance with a value of an electric current supplied thereto.

(2) Description of the Related Art

In general, a proportional solenoid valve which has a valve lift thereof continuously changed by a solenoid force is comprised of a valve section for opening and closing a fluid passage by a valve seat and a valve element arranged in a manner opposed to the valve seat, and a solenoid section for actuating the valve element such that the valve element is moved to and moved away from the valve seat.

A conventional proportional solenoid valve has the component parts of a valve section and a solenoid section formed or mounted in a body formed by machining a block body. The valve section includes two ports bored in the block body, a valve seat integrally formed with the body at a location between the two ports, and a valve element opened and closed by the solenoid section. On the other hand, the solenoid section includes a solenoid coil to which an electric current is supplied from the outside, a core fixedly arranged on the same axis as the valve element and the valve seat and a plunger arranged such that it can move to and from the core in the axial direction to actuate the valve element, and a spring arranged between the plunger and the valve element, for urging the plunger in a direction away from the core.

In general, in the proportional solenoid valve constructed as above, since the valve element is arranged upstream or downstream of the valve seat with respect to flow of a fluid, and pressure applied to the valve element acts in the valve closing or valve opening direction, the characteristic of the valve lift with respect to a solenoid force is quite different depending on the direction of the fluid flow. For this reason, the proportional solenoid valve is given a directional property related to the fluid, and designed in a manner adapted to the direction of the fluid flow.

In the conventional proportional solenoid valve, however, the body in the form of a block is formed with the two ports, and has the component parts of the valve section and the solenoid section for opening and closing the valve element of the valve section, mounted therein, which causes an increase in the size of the proportional solenoid valve.

Further, when the proportional solenoid valve is applied to a location where the direction of the fluid flow is reversed, two pairs of a proportional solenoid valve and a check valve are required to be arranged in parallel such that the two pairs allow fluid to flow in respective directions opposite to each other, which causes an increase in the size of the proportional solenoid valve.

SUMMARY OF THE INVENTION

The present invention has been made in view of the above circumstances, and an object thereof is to provide a small-sized and low-cost proportional solenoid valve which is capable of controlling bidirectional fluid flow.

To achieve the object, there is provided a proportional solenoid valve for changing a valve lift continuously according to a value of an electric current supplied to a solenoid coil. The proportional solenoid valve comprises a core fixed in a hollow cylindrical pipe, a partially hollow shaft having one end thereof fixed in the core axially of the pipe and another end thereof bored with a plurality of valve holes on a circumference thereof such that the bores communicate with a fluid passage extending axially of the pipe, a hollow cylindrical valve element arranged in a manner axially movable using the shaft as a guide so as to open and close the valve holes, a first spring arranged between the core and the hollow cylindrical valve element, for urging the hollow cylindrical valve element in a direction away from the core, a hollow cylindrical plunger fixedly fitted on the hollow cylindrical valve element, and a solenoid coil circumferentially provided on an outside of the pipe.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereinafter, embodiments of the present invention will be described with reference to drawings.

Figure 1:
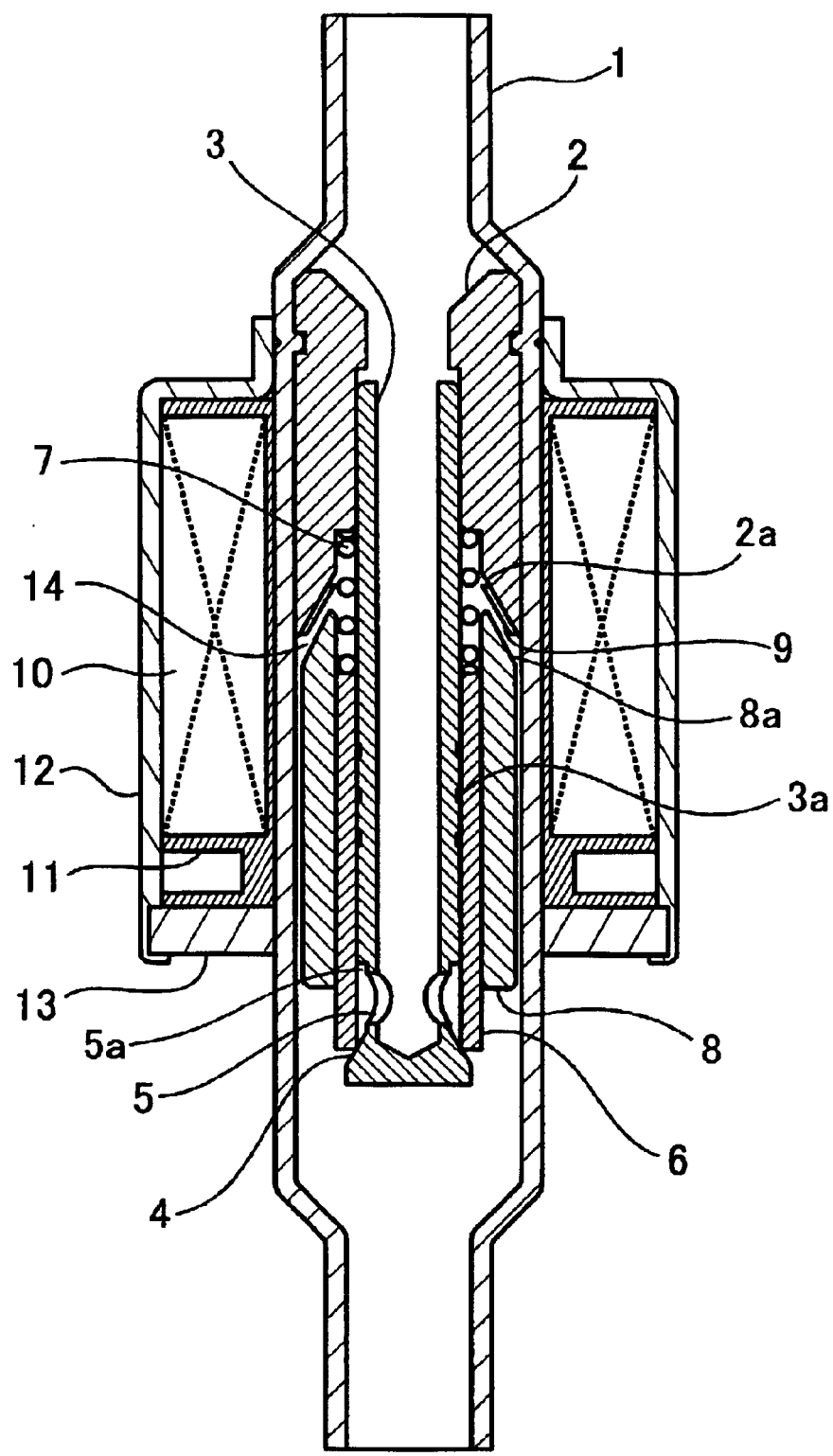
FIG. 1 is a central longitudinal cross-sectional view showing a proportional solenoid valve according to a first embodiment, in a non-energized state.
Figure 2:
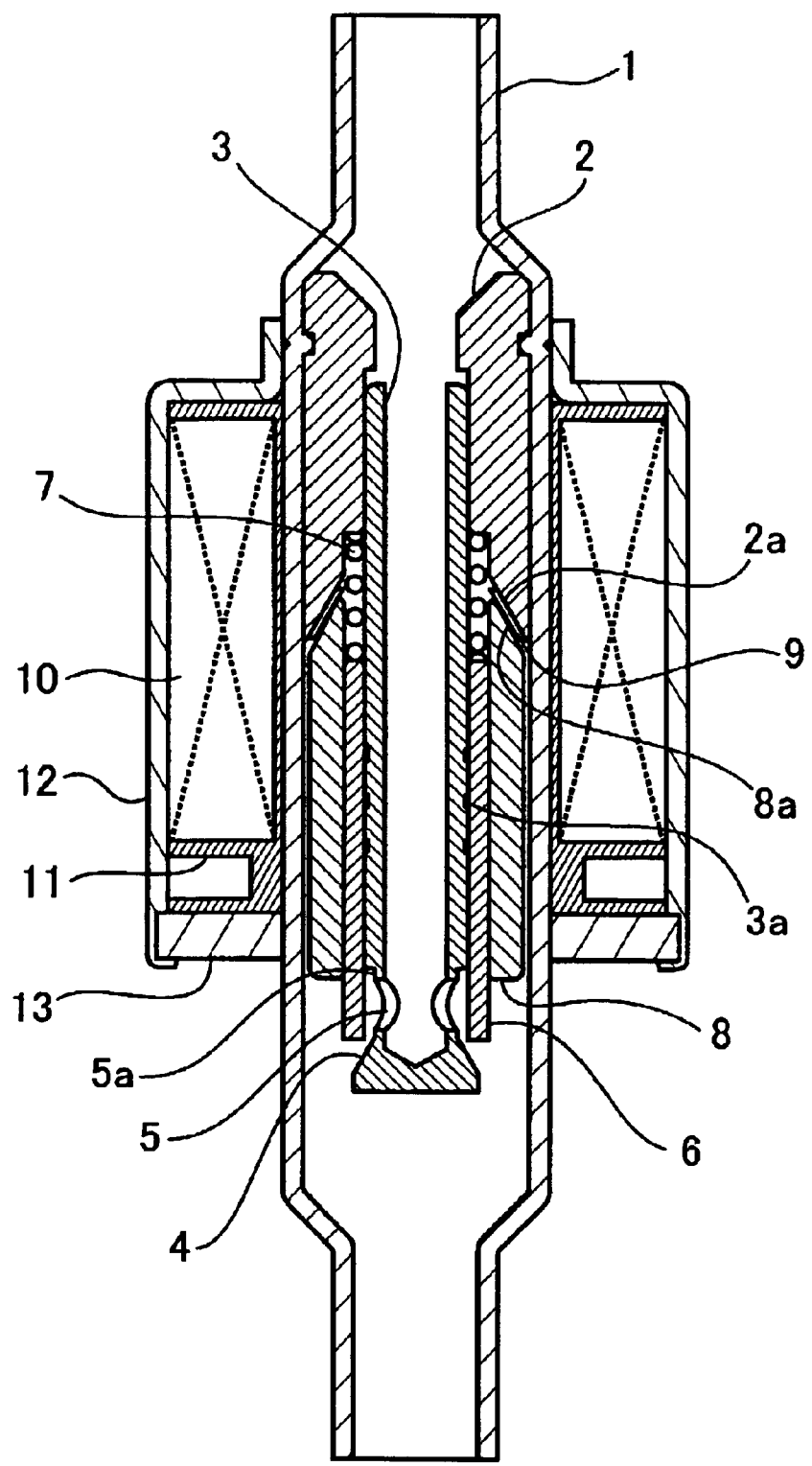
FIG. 2 is a central longitudinal cross-sectional view showing the proportional solenoid valve according to the first embodiment, in an energized state.

First, a first embodiment will be described. FIG. 1 is a central longitudinal cross-sectional view showing a proportional solenoid valve of the first embodiment in a non-energized state, while FIG. 2 is a central longitudinal cross-sectional view showing the same in an energized state.

The proportional solenoid valve of the first embodiment has a body formed by a straight hollow cylindrical pipe 1 which both ends are opening. Within the pipe 1, there is arranged a hollow cylindrical core 2 formed therethrough with a fluid passage extending axially.

A hollow shaft 3 is arranged in the fluid passage of the core 2. The hollow shaft 3 has one end thereof fitted in the fluid passage of the core 2 in a manner communicating with the fluid passage. The shaft 3 has the other end thereof integrally formed with a valve seat 4 forming a conical tapered valve seat having a diameter thereof increasing toward the extremity of the other end of the shaft 3. Further, the shaft 3 is formed with a plurality of valve holes 5 on the circumference thereof at respective locations adjacent to the valve seat 4. On the outer peripheral surface of a portion formed with the valve holes 5, there is formed a communication groove 5a along the whole circumference of the shaft 3.

A hollow cylindrical valve element 6 made of a non-magnetic material is arranged between the core 2 and the valve seat 4 in a manner axially movable using the shaft 3 as a guide. The shaft 3 that guides the hollow cylindrical valve element 6 has the outer peripheral surface thereof formed with a plurality of grooves 3a along the circumference which form a fluid seal on the sliding surface. A spring 7 is arranged between the hollow cylindrical valve element 6 and the core 2, for urging the hollow cylindrical valve element 6 in a direction for seating the same on the valve seat 4. Further, a hollow cylindrical plunger 8 is fixedly fitted on the hollow cylindrical valve element 6 to perform axial motion together with the valve element 6. The plunger 8 is formed to have such an outer diameter that a predetermined gap is produced between the pipe 1 and the plunger 8, so that equal fluid pressures can be applied to the axial both end faces of the plunger 8 through the gap.

The core 2 and the plunger 8 has respective end faces 2a, 8a opposed to each other, and the end faces 2a, 8a are formed to have respective tapered surfaces sloped with identical gradients so as to improve linearity of attraction characteristics with respect to an applied electric current. The end face 2a of the core 2 has a washer 9 of a non-magnetic material arranged thereon so as to suppress attraction of the plunger 8 to the core 2 by residual magnetism when the end face 8a of the plunger 8 is demagnetized in a state of being in contact with the washer 9.

Fitted on the outer peripheral surface of the pipe 1 is a bobbin 11 having a solenoid coil 10 wound therearound. The bobbin 11 is surrounded by a first yoke 12. The first yoke 12 has an upper end portion thereof mounted on the pipe 1 in a manner covering the outside of the bobbin 11. On the other hand, the lower end of the first yoke 12 is closed by a second yoke 13 from below the bobbin 11 to form a continuous magnetic circuit.

The pipe 1 has opposite open both ends thereof each drawn in a manner adapted to the diameter of a mating pipe to which the pipe 1 is to be welded for integrating the proportional solenoid valve in a system.

In the proportional solenoid valve, the core 2, the plunger 8, and the first yoke 12 and the second yoke 13 form a magnetic circuit including the solenoid coil 10, with the core 2 functioning as a fixed iron core and the plunger 8 as a movable iron core.

According to the proportional solenoid valve constructed as above, when it is not energized, the hollow cylindrical valve element 6 and the plunger 8 are moved downward, as viewed in the figure, by the spring 7, as shown in FIG. 1, whereby the hollow cylindrical valve element 6 is seated on the valve seat 4. As a result, the valve holes 5 and the communication groove 5a adjacent to the valve seat 4 are closed by the side wall of the hollow cylindrical valve element 6, whereby the fluid passage is blocked. When a fluid flows into the pipe 1 via the upper open end thereof as viewed in the figure in this state, the fluid is introduced into the hollow of the shaft 3. However, since the valve holes 5 and the communication groove 5a are closed by the hollow cylindrical valve element 6, the fluid is prevented from flowing out via the lower open end of the pipe 1. On the other hand, when the fluid flows into the pipe 1 via the lower open end thereof as viewed in the figure, the fluid flows through the gap between the pipe 1 and the plunger 8 and is introduced into a space 14 formed between the end face 2a of the core 2 and the end face 8a of the plunger 8. This causes equal fluid pressures to act on the respective axially opposite sides of the plunger 8 and those of the hollow cylindrical valve element 6, which prevents valve opening/closing operations from being adversely affected by the pressure of the fluid, thereby making it possible to maintain the valve closed state only by the urging force of the spring 7.

On the other hand, when the proportional solenoid valve is energized with the maximum current, the plunger 8 is attracted toward the core 2 against the urging force of the spring 7, as shown in FIG. 2, and the end face 8a of the plunger 8 comes into contact with the washer 9. At this time, the hollow cylindrical valve element 6 moves together with the plunger 8 to stop closing of the valve holes 5 and the communication groove 5a and thereby allow communication between the open both ends of the pipe 1 via the valve holes 5 and the communication groove 5a. Consequently, when fluid flows into the pipe 1 via the upper open end thereof as viewed in the figure, the fluid passes through the fluid passage in the shaft 3 to enter the communication groove 5a via the valve holes 5. Then, after filling the whole communication groove 5a, the fluid flows toward the lower open end as viewed in the figure, via a space between the conical tapered surface of the valve seat 4 and the end face of the hollow cylindrical valve element 6. Similarly, when fluid flows in via the lower open end as viewed in the figure, the fluid enters the communication groove 5a via the space between the conical tapered surface of the valve seat 4 and the end face of the hollow cylindrical valve element 6. Then, the fluid enters the fluid passage in the shaft 3 via the valve holes 5, followed by flowing toward the upper open end, as viewed in the figure, of the pipe 1.

Now, when the value of electric current to be supplied to the solenoid coil 10 is changed, the plunger 8 is stopped at an axial position where the attractive force of the core 2 and the urging force of the spring 7 are balanced with each other, depending on the current value. Thus, the proportional solenoid valve can be set to a valve lift corresponding to the current value.

As described above, according to the proportional solenoid valve of the first embodiment, it is possible to control the flow rate of fluid in either direction of fluid flow. Further, since the opening degree of the valve holes 5 and that of the communication groove 5a in the energized state of the proportional solenoid valve can be changed by changing the amount of press-fitting of the shaft 3, which is press-inserted into the fluid passage of the core 2 and fitted in the inner wall of the same, into the core 2, it is possible to adjust the flow rate characteristics in the fully-opened state of the proportional solenoid valve.

It is possible to change the valve lift of the proportional solenoid valve continuously according to the value of electric current supplied thereto for energization. Next, an example of the characteristic of the proportional solenoid valve is shown.

Figure 3:
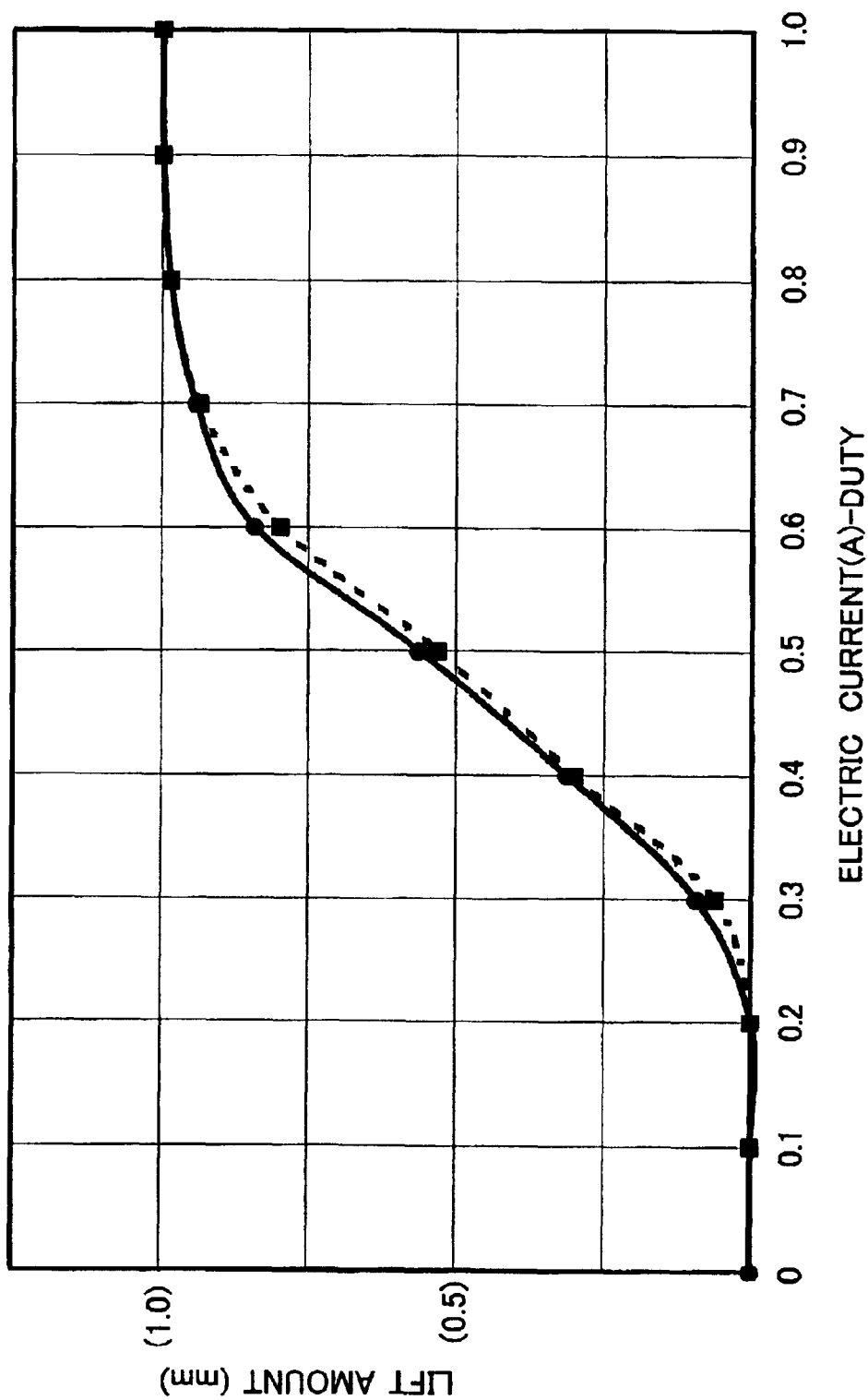
FIG. 3 is a graph showing a current-lift characteristic of the proportional solenoid valve.
Figure 4:
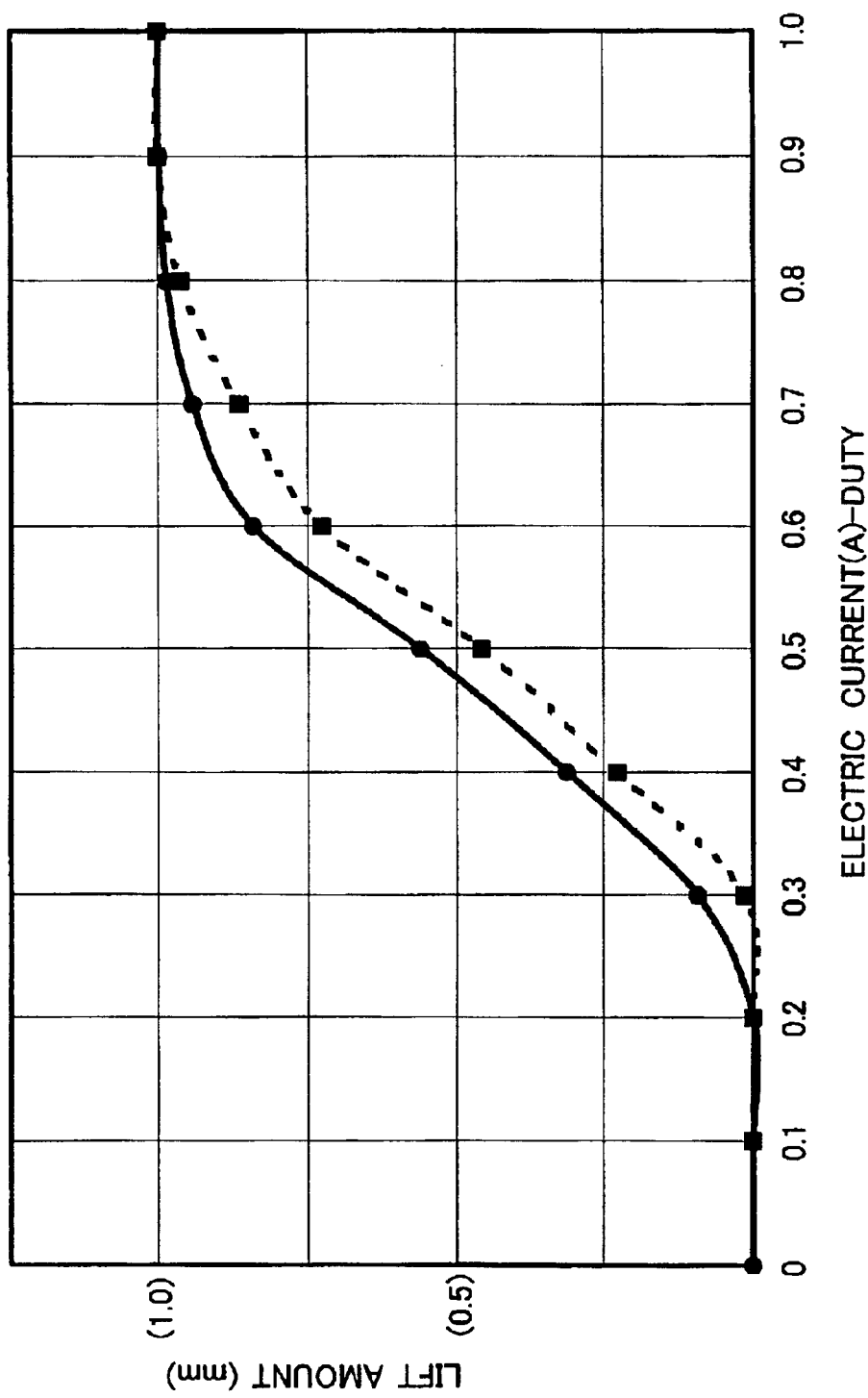
FIG. 4 is a graph showing an example of a current-lift characteristic of a conventional proportional solenoid valve.

FIG. 3 is a graph showing the current-lift characteristic of the proportional solenoid valve. Further, FIG. 4 shows an example of the current-lift characteristic of a conventional proportional solenoid valve for comparison. In each of FIGS. 3 and 4, the abscissa represents electric current supplied to the solenoid coil, while the ordinate represents the amount of valve lift of the hollow cylindrical valve element toward the core. Changes in the valve lift amount with an increase in the value of electric current supplied for energization are indicated by a solid line, and changes in the valve lift amount with a decrease in the value of electric current supplied for energization are indicated by a dotted line.

When the proportional solenoid valve is not energized, the end face 8a of the plunger 8 is held in a state completely separated from the washer 9 arranged on the end face 2a of the core 2, as shown in FIG. 1. As the current value is progressively increased, the end face 8a of the plunger 8 is gradually brought closer to the washer 9. Then, when the electric current reaches a predetermined current value, the end face 8a is brought into contact with the washer 9 as shown in FIG. 2. Thereafter, as the value of electric current supplied for energization is progressively decreased from this state, the end face 8a gradually moves away from the washer 9, and when the supply of electric current is stopped, the end face 8a is completely separated from the washer 9 again, as shown in FIG. 1.

In the proportional solenoid valve that operates as above, the relationship between the value of electric current supplied for energization and the valve lift amount of the hollow cylindrical valve element 6 in the case of the current value being progressively increased to the predetermined value as shown in FIG. 3 is represented by an S-shaped curve of the solid line in the figure. On the other hand, in the case of the current value being progressively decreased after having reached the predetermined value, the relationship between the current value and the valve lift amount of the hollow cylindrical valve element 6 is represented by an S-shaped curve of the dotted line in the figure. The curves in the respective cases differ from each other, which means that the relationship between the current value and the valve lift amount of the hollow cylindrical valve element 6 has a hysteresis characteristic. As shown in FIG. 4, the conventional proportional solenoid valve also has the current-lift characteristic with hysteresis.

However, in the proportional solenoid valve of the present invention, the difference between each valve lift amount in the process of increasing electric current and the corresponding valve lift amount in the process of decreasing electric current is smaller than in the prior art, which means that a maximum hysteresis error is reduced. The reason for this is that pressures which the plunger 8 receives on the respective axially both ends thereof are equal to each other, and hence the plunger 8 is prevented from being adversely affected by fluid pressure when moving in the valve-closing direction or in the valve-opening direction, and that a sliding area between the hollow cylindrical valve element 6 and the shaft 3 for axial motion of the hollow cylindrical valve element 6 using the shaft 3 as a guide is small.

The proportional solenoid valve described above can be utilized e.g. as an electrically controlled expansion valve for adiabatically expanding refrigerant within a refrigeration cycle used in an air conditioning system for an automotive vehicle.

Figure 5:
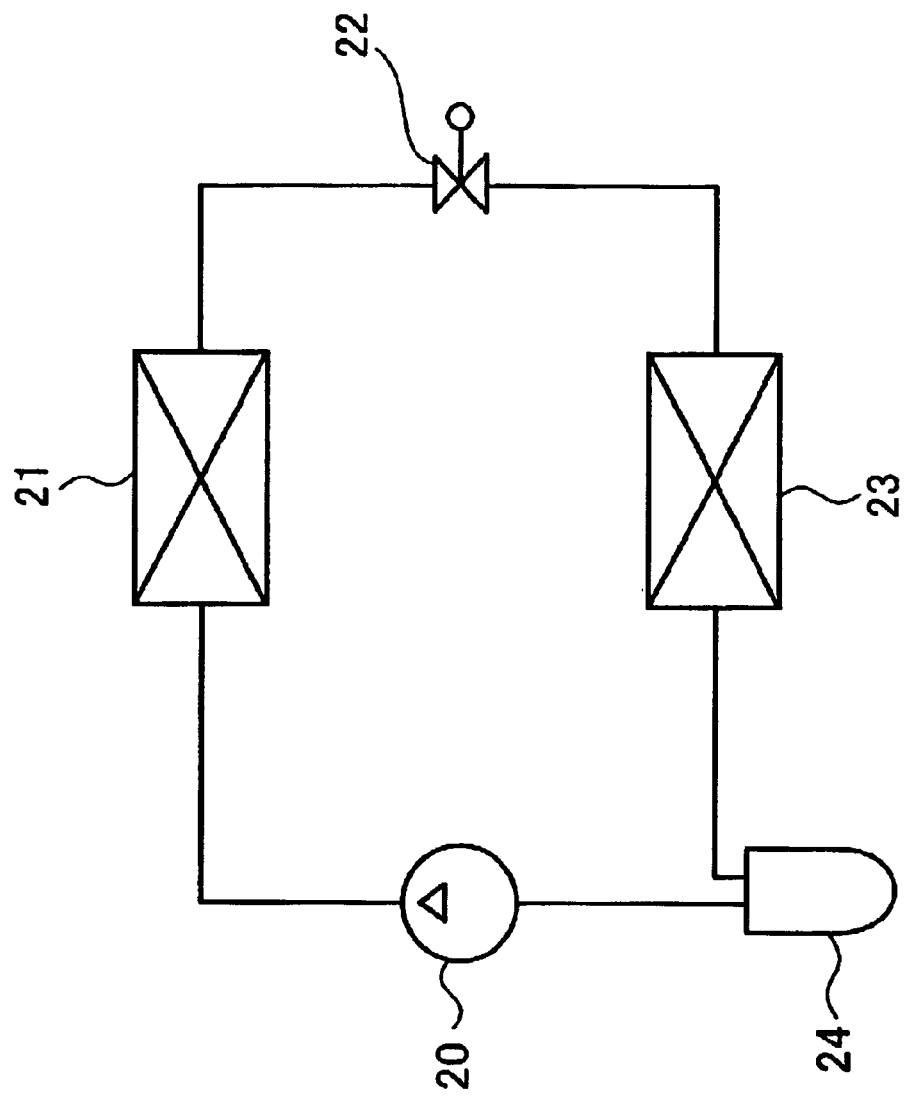
FIG. 5 is a diagram useful in explaining a refrigeration cycle for cooling, in which the proportional solenoid valve is integrated.

FIG. 5 is a diagram useful in explaining a refrigeration cycle for cooling in which the proportional solenoid valve is integrated. In this refrigeration cycle for cooling, first, gaseous refrigerant compressed by a compressor 20 is condensed by heat exchange with outside air in a condenser 21, and the resulting liquid refrigerant flows into the proportional solenoid valve 22 functioning as an expansion valve. In the proportional solenoid valve 22, the supplied liquid refrigerant is adiabatically expanded into low-temperature and low-pressure refrigerant. This refrigerant is supplied to an evaporator 23 to exchange heat with air within a vehicle compartment, whereby the air is cooled. The refrigerant evaporated by the heat exchange in the evaporator 23 is delivered to an accumulator 24 to be separated into gas and liquid, followed by gaseous refrigerant alone being returned to the compressor 20.

Figure 6:
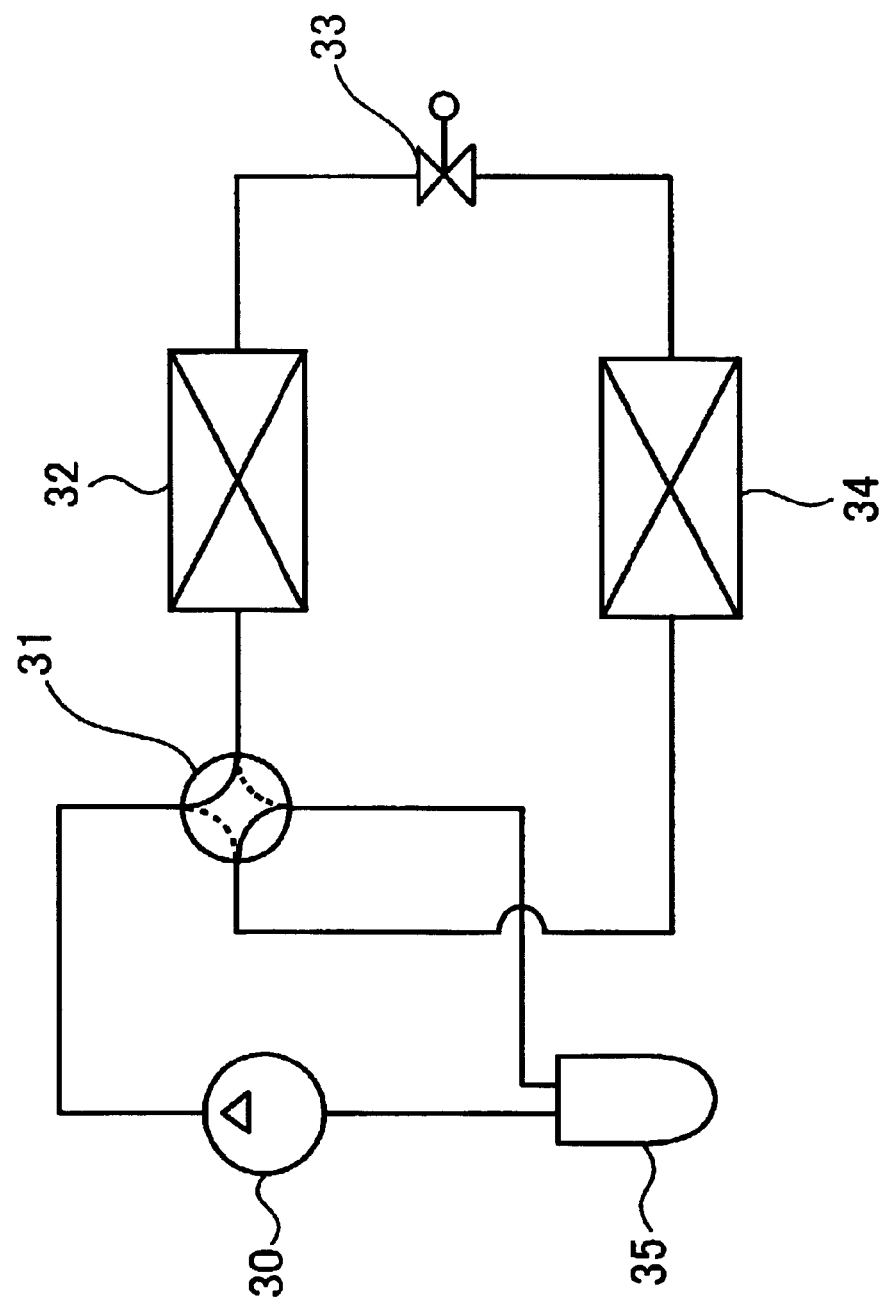
FIG. 6 is a diagram useful in explaining a refrigeration cycle for cooling and heating, in which the proportional solenoid valve is integrated.

Further, this proportional solenoid valve can be applied to a refrigeration cycle for both cooling and heating based on the heat pump method, by making use of its characteristic of allowing bidirectional flow of fluid. FIG. 6 is a diagram useful in explaining the refrigeration cycle for cooling and heating in which the proportional solenoid valve is integrated.

First, when this refrigeration cycle is operating for cooling, gaseous refrigerant compressed by a compressor 30 is guided to an outdoor heat exchanger 32 operating as a condenser, via a path in a four-way valve 31 represented by a solid line in the figure, and condensed by the outdoor heat exchanger 32. The resulting liquid refrigerant is delivered to the proportional solenoid valve 33 which functions as the expansion valve, where it is adiabatically expanded. Then, the adiabatically expanded refrigerant is supplied to an indoor heat exchanger 34 operating as an evaporator, to exchange heat with air in a vehicle compartment. The refrigerant having passed through the indoor heat exchanger 34 flows via a path in the four-way valve 31 represented by a solid line in the figure, into an accumulator 35, where it is separated into gas and liquid, followed by gaseous refrigerant alone being returned to the compressor 30.

On the other hand, when the refrigeration cycle is operating for heating, high-temperature and high-pressure gaseous refrigerant compressed by the compressor 30 is guided to the indoor heat exchanger 34 via the four-way valve 31 switched to open a path represented by a dotted line in the figure. The gaseous refrigerant supplied to the indoor heat exchanger 34 exchanges heat with air in the vehicle compartment to heat the air. The liquid refrigerant formed by condensation due to the heat exchange in the indoor heat exchanger 34 is adiabatically expanded by the proportional solenoid valve 33 and then delivered to the outdoor heat exchanger 32. In the outdoor heat exchanger 32, the supplied refrigerant is evaporated by heat exchange with the outside air and delivered to the accumulator 35 via a path in the four-way valve 31 represented by a dotted line in the figure. Then, the refrigerant is separated into gas and liquid by the accumulator 35, followed by gaseous refrigerant alone being returned to the compressor 30.

As described above, from whichever of the open both ends of the pipe 1 a liquid may flow in, the proportional solenoid valve of the invention is capable of controlling the flow rate of the liquid. Therefore, it is possible to apply the proportional solenoid valve not only to the refrigeration cycle for cooling, in which refrigerant flow is unidirectional, but also the refrigeration cycle for both cooling and heating, in which refrigerant flow is reversed.

Figure 7:
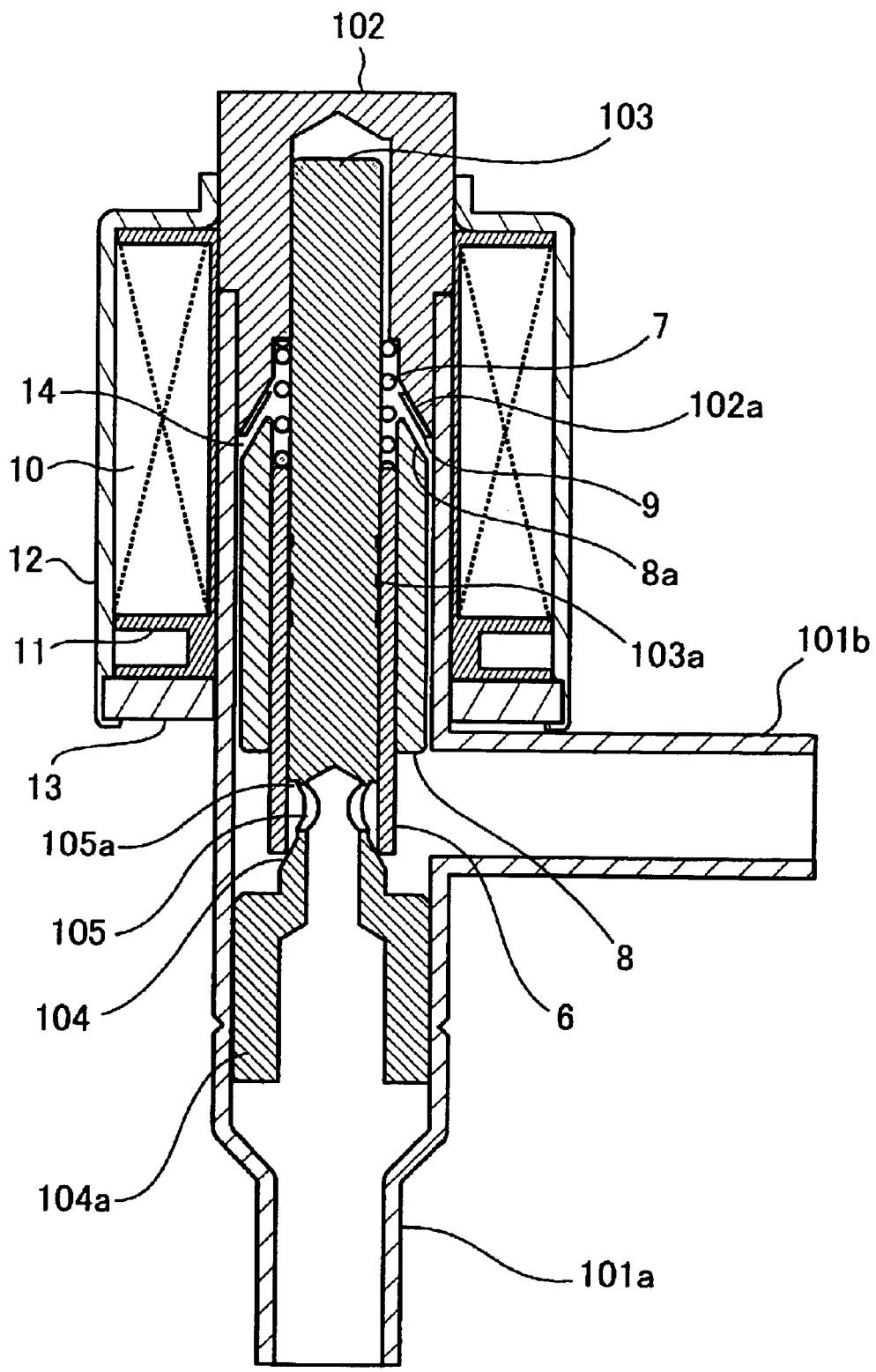
FIG. 7 is a central longitudinal cross-sectional view showing a proportional solenoid valve according to a second embodiment, in a non-energized state.
Figure 8:
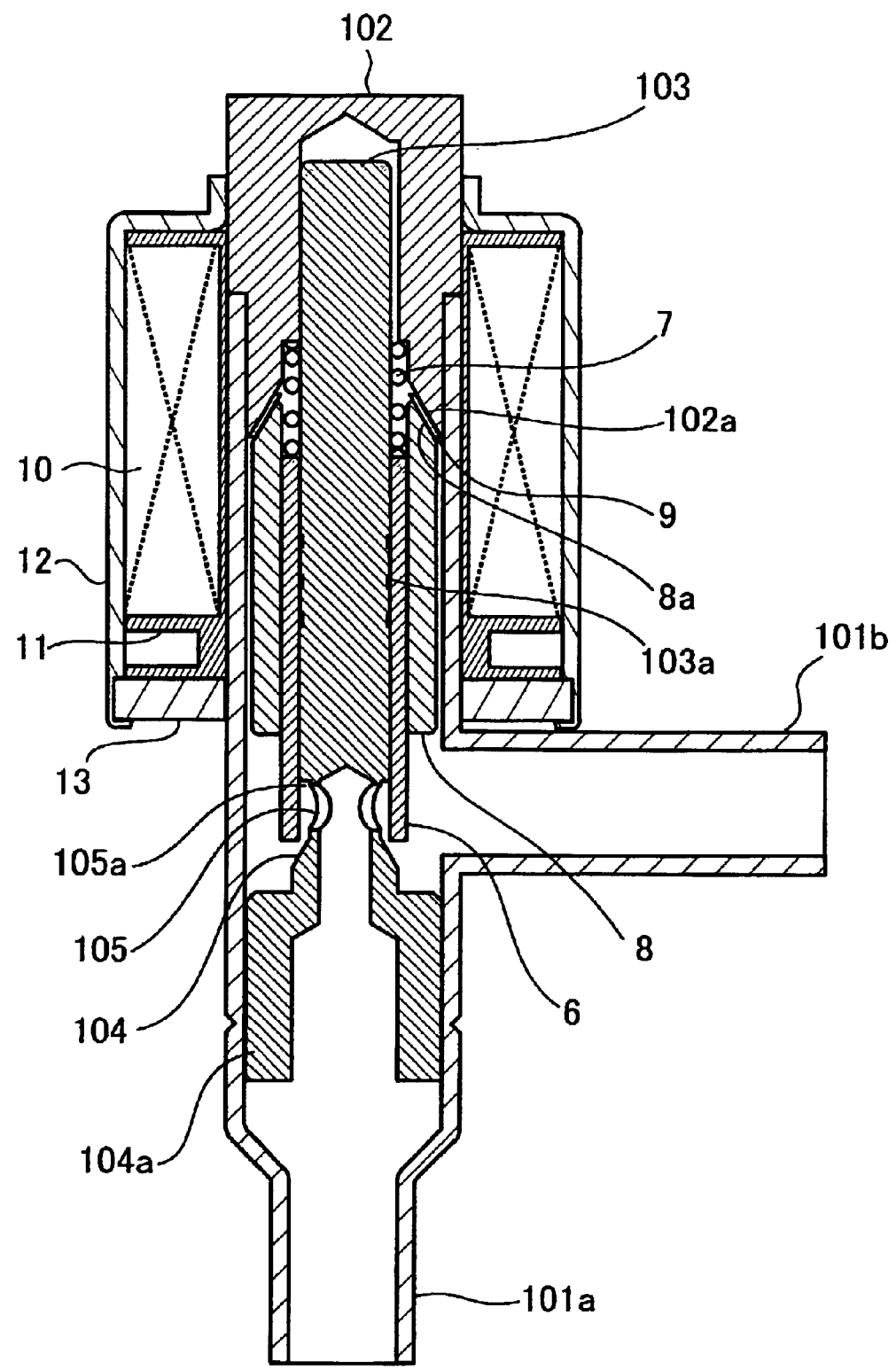
FIG. 8 is a central longitudinal cross-sectional view showing the proportional solenoid valve according to the second embodiment, in an energized state.

Next, a second embodiment will be described. FIG. 7 is a central longitudinal cross-sectional view showing a proportional solenoid valve of the second embodiment in a non-energized state, while FIG. 8 is a central longitudinal cross-sectional view showing the proportional solenoid valve of the second embodiment in an energized state. Component parts and elements in FIGS. 7 and 8 corresponding to those in FIGS. 1 and 2 are designated by identical reference numerals.

The proportional solenoid valve of the second embodiment has a T-shaped body formed by a hollow cylindrical first pipe 101a which both ends are opening and a second pipe 101b joined perpendicularly to the first pipe 101a. A core 102 is fixedly fitted in the first pipe 101a in a manner closing one end of the first pipe 101a.

Within the core 102, there is arranged a shaft 103 axially of the first pipe 101a, with one end thereof fitted in the core 102. The shaft 103 has the outer peripheral surface thereof formed with a plurality of grooves 103a along the circumference, which form a fluid seal with a hollow cylindrical valve element 6.

A valve seat 104 and a fixed portion 104a are integrally formed with the other end of the shaft 103 which is not fitted in the core 102. Bored at a location between the shaft 103 and the valve seat 104 are valve holes 105 communicating with a fluid passage extending axially, and a communication groove 105a is formed along the whole circumference of the shaft 103 at the location where the valve holes 105 are bored. The fixed portion 104a in the form of a large diameter hollow cylinder is fixed in the first pipe 101a in a state in which the outer peripheral surface of the fixed portion 104a is held in intimate contact with the inner peripheral surface of the first pipe 101a.

The hollow cylindrical valve element 6 formed of a non-magnetic material is arranged between the core 102 and the valve seat 104 in a manner axially movable using the shaft 103 as a guide. A spring 7 is arranged between the hollow cylindrical valve element 6 and the core 102, for urging the hollow cylindrical valve element 6 in a direction for seating the same on a tapered face of the valve seat 104. Further, a hollow cylindrical plunger 8 is fixedly fitted on the hollow cylindrical valve element 6 in a state a predetermined gap is formed between the inner peripheral surface of the first pipe 101a and the plunger 8 to perform axial motion together with the valve element 6. Further, an end face 8a of the plunger 8 and an end face 102a of the core 102 opposed to the end face 8a are formed to have respective tapered surface sloped with identical gradients. The end face 102a of the core 102 has a washer 9 of a non-magnetic material arranged thereon, and the end face 8a of the plunger 8 is brought into contact with the washer 9.

An open end of the first pipe 101a opposite to the open end in which the core 102 is fitted is drawn in a manner adapted to the diameter of a mating pipe for welding.

According to the proportional solenoid valve constructed as above, when it is not energized, the hollow cylindrical valve element 6 and the plunger 8 are moved downward, as viewed in FIG. 7, by the spring 7, as shown in FIG. 7, and the hollow cylindrical valve element 6 is seated on the valve seat 104. As a result, the valve holes 105 bored in the valve seat 104 and the communication groove 105a are closed by the side wall of the hollow cylindrical valve element 6, whereby the fluid passage is blocked. When fluid flows in via the lower open end, as viewed in the figure, of the first pipe 101a in this state, the fluid reaches the valve holes 105, but since the valve holes 105 are closed by the hollow cylindrical valve element 6, the fluid is prevented from flowing out toward an open end of the second pipe 101b, shown on a right-hand side. On the other hand, when fluid flows in via the open end of the second pipe 101b, the fluid is introduced into a space 14 formed between the end face 102a of the core 102 and the end face 8a of the plunger 8, via a gap between the first pipe 101a and the plunger 8. As a result, fluid pressures equal to each other act on the respective axially both sides of the plunger 8 and those of the hollow cylindrical valve element 6, which prevents valve opening/closing operations from being adversely affected by the fluid pressure, thereby making it possible to maintain the valve closed state by the urging force of the spring 7.

On the other hand, when the maximum current is supplied to a solenoid coil 10, the plunger 8 is attracted toward the core 102 against the urging force of the spring 7, as shown in FIG. 8, and the end face 8a of the plunger 8 is brought into contact with the washer 9. At this time, the hollow cylindrical valve element 6 moves together with the plunger 8, whereby the valve holes 105 and the communication groove 105a are fully opened, and the open ends of the respective first and second pipes 101a, 101b communicate with each other via the valve holes 105 and the communication groove 105a. Consequently, the proportional solenoid valve allows bidirectional flow of fluid, i.e. allows a fluid to flow in both of a case of the fluid flowing in via the upper open end, as viewed in the figure, of the first pipe 101a and a case of the fluid flowing in via the open end of the second pipe 101b.

Now, when the value of electric current supplied to the solenoid coil 10 is changed, the plunger 8 and the hollow cylindrical valve element 6 are controlled to a valve lifting position dependent on the current value.

According to the above proportional solenoid valve, before the open ends of the first and second pipes 101a, 101b are joined to mating pipes, respectively, e.g. by welding, it is possible to remove a bobbin 11 having the solenoid coil 10 wound therearound and first and second yokes 12 and 13, all of which are arranged outside the first pipe 101a and the core 102, so as to prevent effects of heat generated by the welding. This makes it possible to prevent the solenoid coil 10 and others from interfering with pipe welding work, thereby improving workability in mounting the proportional solenoid valve as well as to avoid adverse affects, such as distortion, caused by welding heat.

Figure 9:
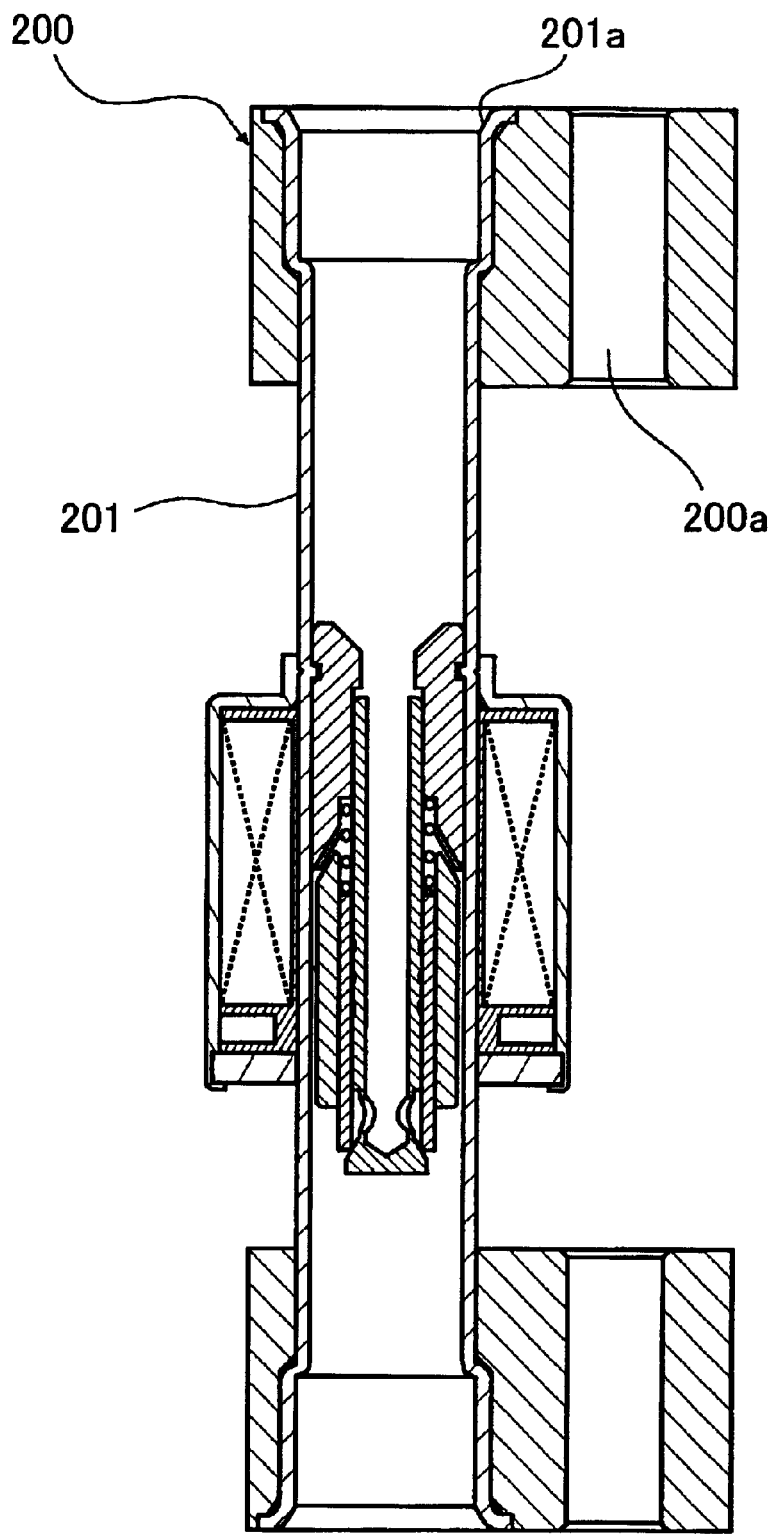
FIG. 9 is a central longitudinal cross-sectional view showing a proportional solenoid valve according to a third embodiment, in a non-energized state.
Figure 10:
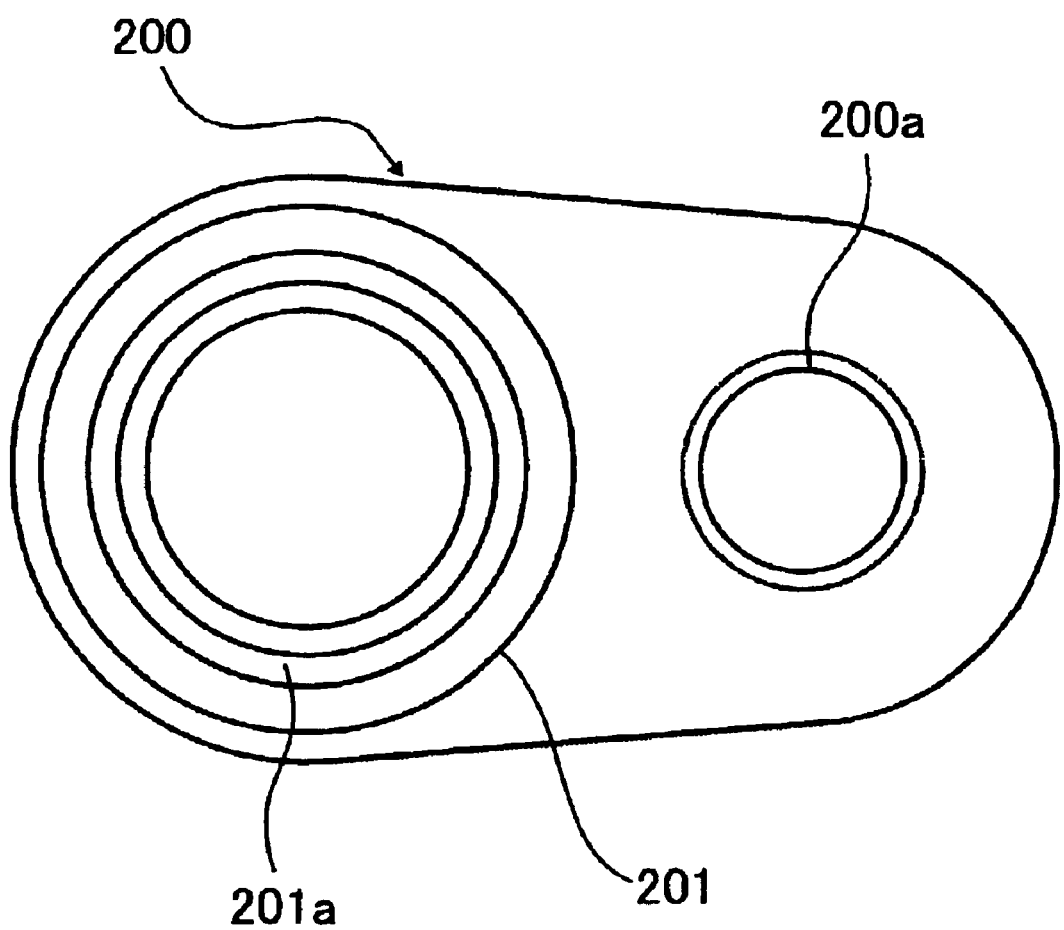
FIG. 10 is a plan view of the proportional solenoid valve according to the third embodiment.

Next, a third embodiment will be described. FIG. 9 is a central longitudinal cross-sectional view showing a proportional solenoid valve of the third embodiment in a non-energized state, and FIG. 10 is a plan view of the proportional solenoid valve of the third embodiment. In FIG. 10, a core, a valve element, a valve seat and a plunger are omitted from illustration.

The proportional solenoid valve of the third embodiment is constructed, as shown in FIGS. 9 and 10, by fitting a piping joint 200 for use in connection to a mating pipe on each of the open both ends of the proportional solenoid valve of the first embodiment.

The piping joint 200 is formed to have a generally oval shape, and fitted on each open end of a pipe 201 of the proportional solenoid valve. The diameter of the end 201a of the pipe 201 is expanded after the piping joint 200 having been fitted on the pipe 201, so as to prevent the piping joint 200 from falling off. Further, the piping joint 200 is formed with a through hole 200a through which a bolt extends at a location outward of the pipe 201.

When the proportional solenoid valve having the piping joint 200 fitted thereon is to be connected to a mating pipe, a piping joint identical in structure to the piping joint 200 is fitted on the mating pipe, and the two piping joints are faced to each other via an O ring, and then fixed to each other by inserting a bolt through the through holes thereof and fastening with a nut.

According to the proportional solenoid valve constructed as above, it is possible to connect the pipe 201 to mating pipes via respective O rings, which enhances durability against vibration, compared with a case where the pipe 201 is joined to mating pipes by welding. Particularly, the proportional solenoid valve can be effectively applied to cases of use thereof at locations where violent vibration occur, such as in an automotive vehicle.

Although in the third embodiment, the piping joints are fitted on the open both ends of the proportional solenoid valve of the first embodiment, a single piping joint may be fitted only on either of the open ends. Further, the piping joints can be fitted on the open ends of the proportional solenoid valve having the T-shaped body described in the second embodiment.

Figure 11:
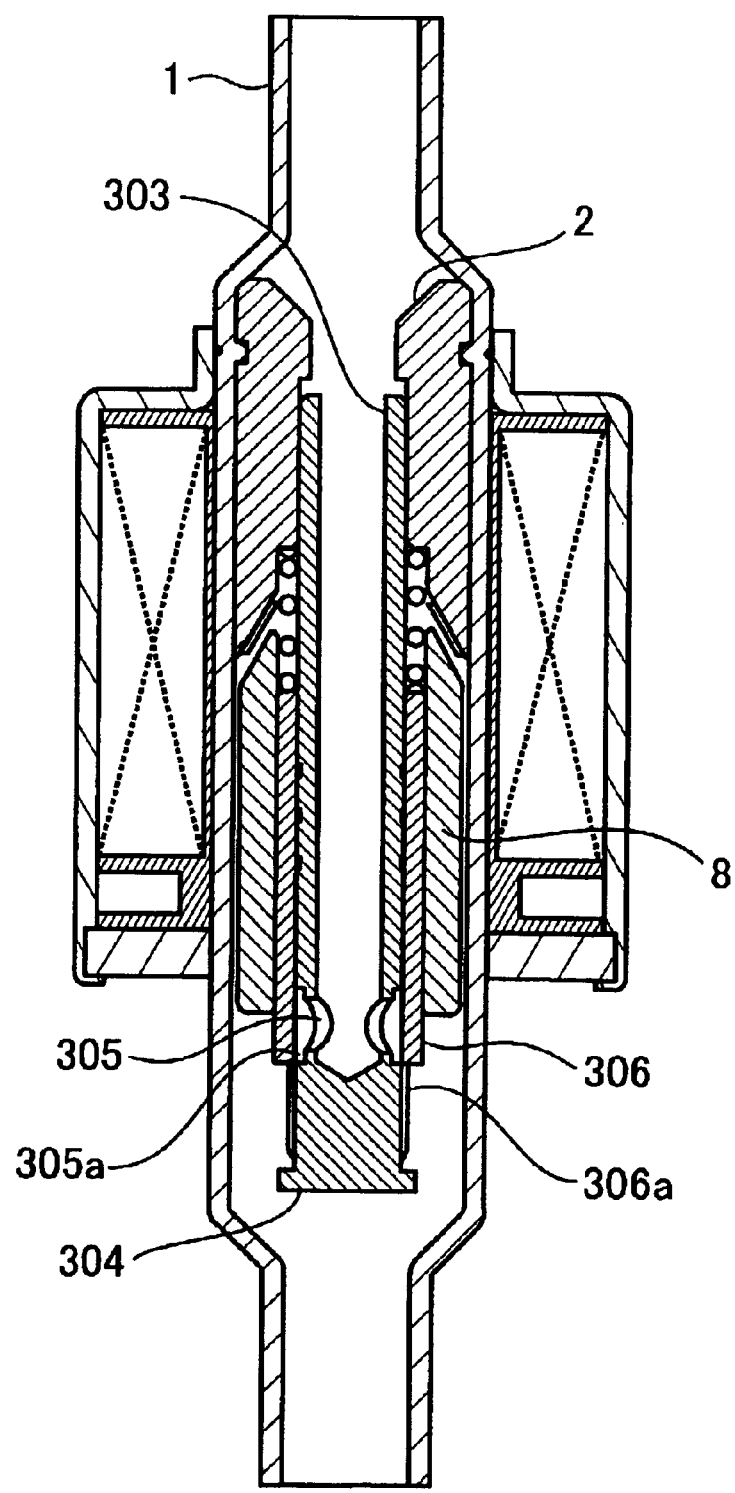
FIG. 11 is a central longitudinal cross-sectional view showing a proportional solenoid valve according to a fourth embodiment, in a non-energized state.
Figure 12:
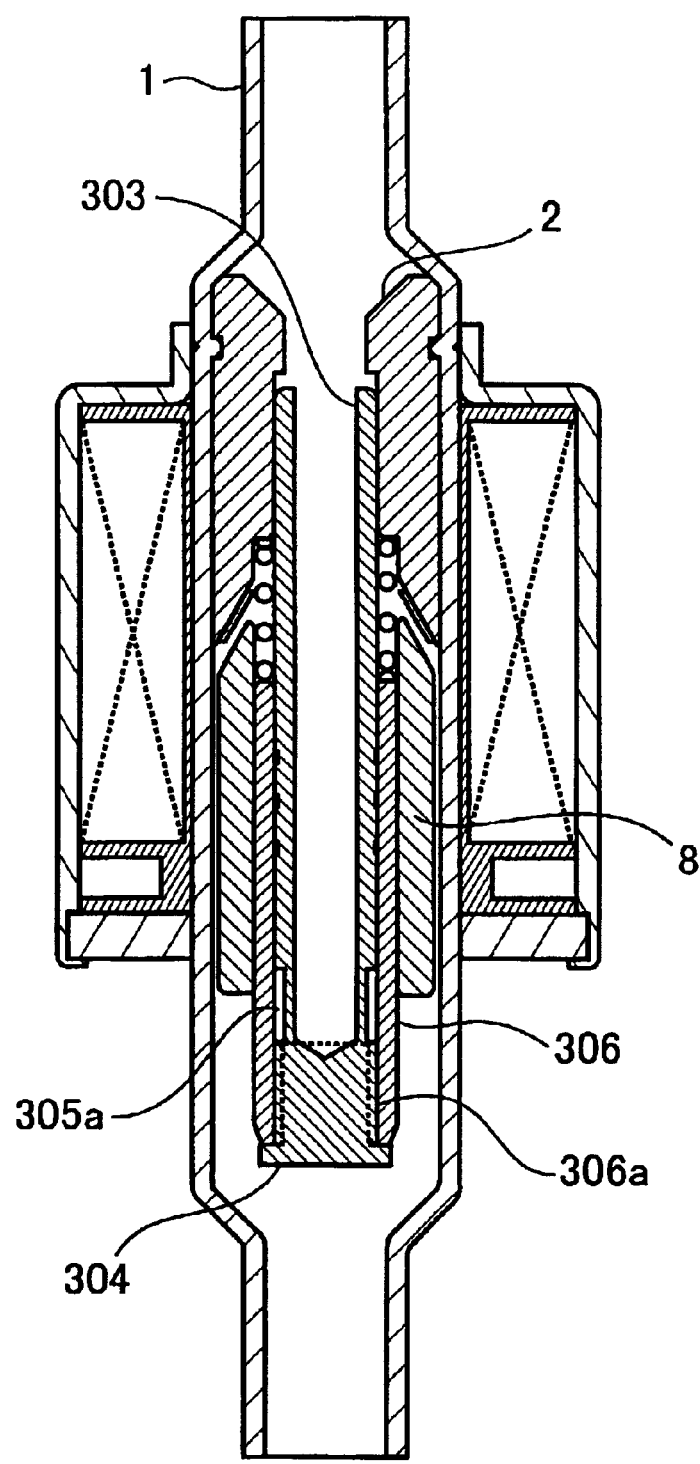
FIG. 12 is a central longitudinal cross-sectional view showing the FIG. 11 proportional solenoid valve as viewed from a position rotated through 90 degrees from the FIG. 11 position about an axis thereof.
Figure 13:
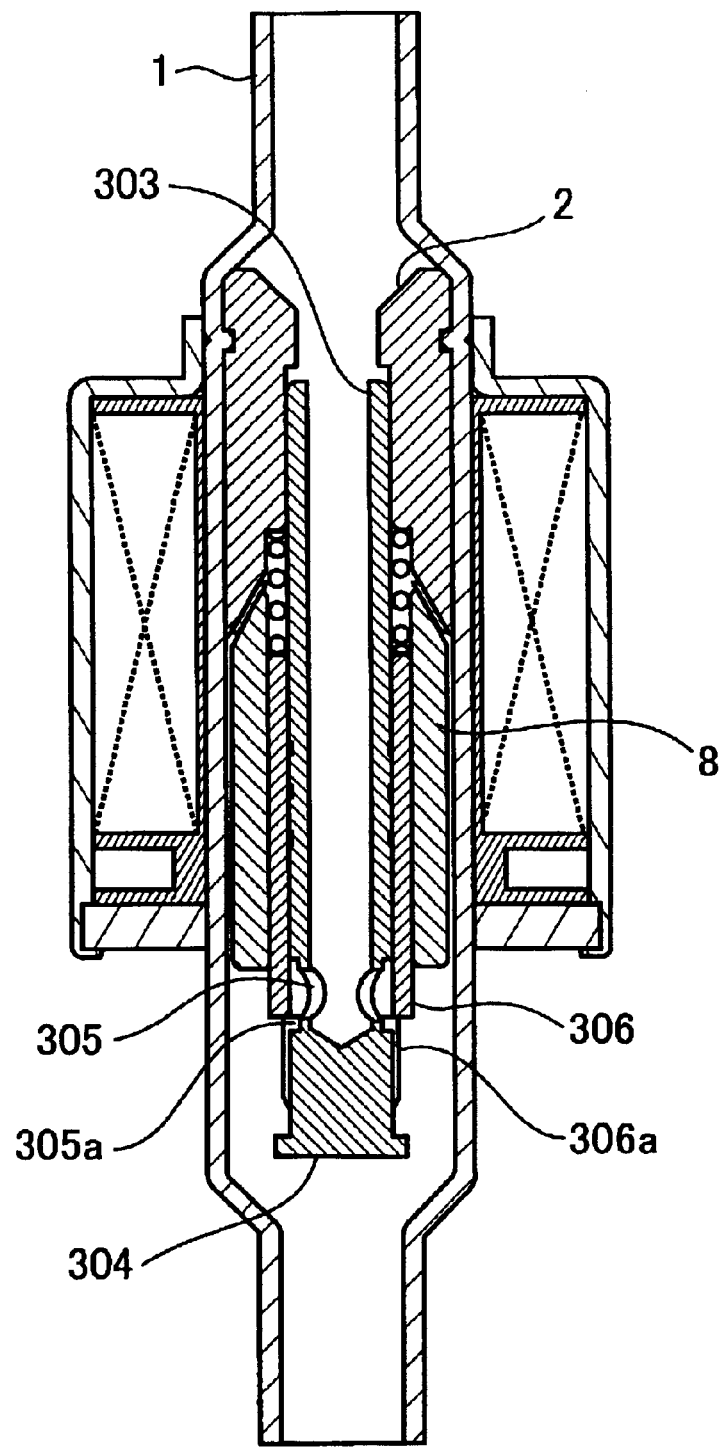
FIG. 13 is a central longitudinal cross-sectional view showing the proportional solenoid valve according to the fourth embodiment, in an energized state.
Figure 14:
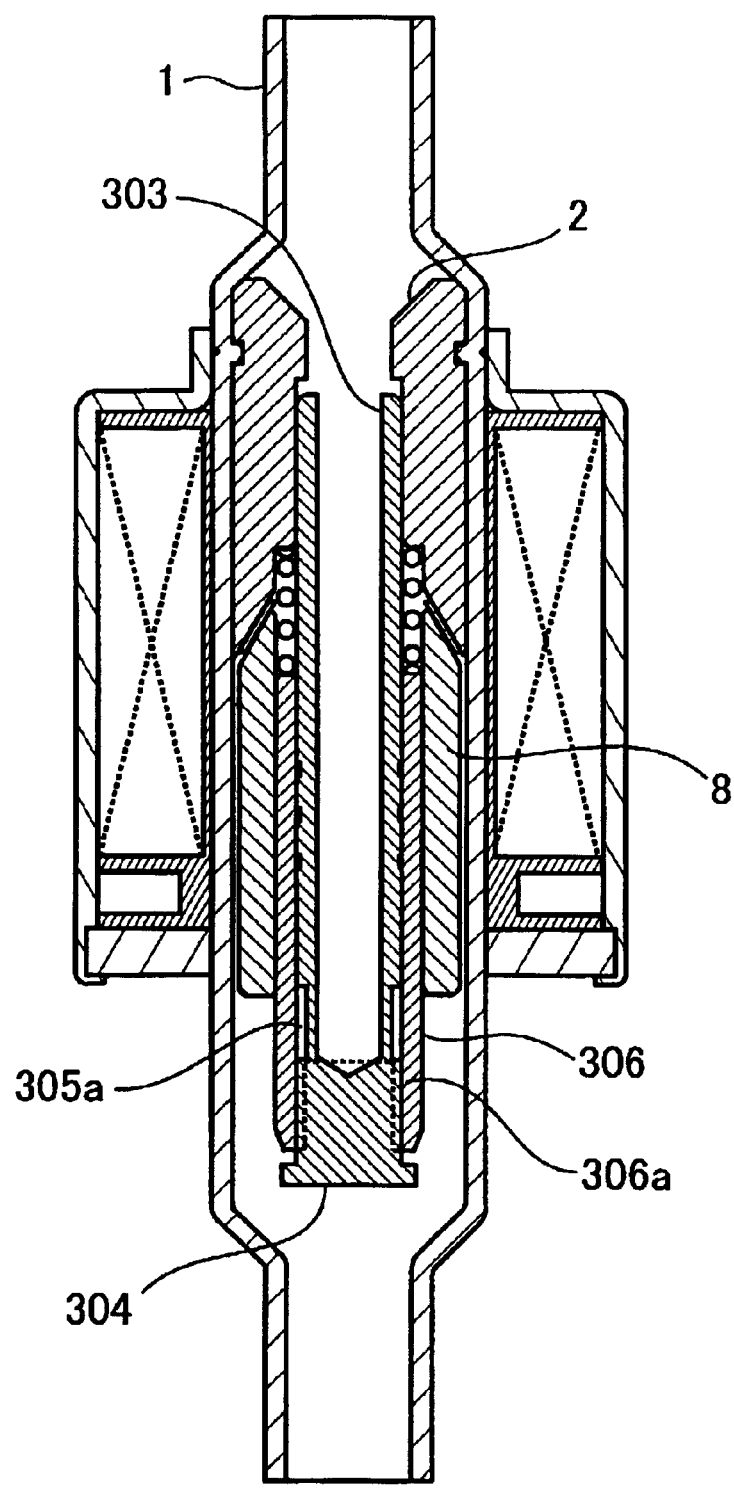
FIG. 14 is a central longitudinal cross-sectional view showing the FIG. 13 proportional solenoid valve as viewed from a position rotated through 90 degrees from the FIG. 13 position about an axis thereof.

Next, a fourth embodiment will be described. FIG. 11 is a central longitudinal cross-sectional view showing a proportional solenoid valve of the fourth embodiment in a non-energized state, and FIG. 12 is a central longitudinal cross-sectional view of the FIG. 11 proportional solenoid valve as viewed from a position rotated through 90 degrees from the FIG. 11 position about its axis. FIG. 13 is a central longitudinal cross-sectional view showing the proportional solenoid valve of the fourth embodiment in an energized state, and FIG. 14 is a central longitudinal cross-sectional view of the FIG. 13 proportional solenoid valve as viewed from a position rotated through 90 degrees from the FIG. 13 position about its axis. Component parts and elements in FIGS. 11 to 14 corresponding to those in FIGS. 1 and 2 are designated by identical reference numerals.

The proportional solenoid valve of the fourth embodiment has a hollow shaft 303 arranged in a fluid passage extending through a core 2 fixed in a pipe 1. The shaft 303 has one end thereof fitted in the fluid passage in the core 2. A solid stopper 304 having a flange projecting radially outwardly from the whole periphery of an extreme end thereof is integrally formed with the other end of the shaft 303, which is not fitted in the core 2. The shaft 303 has two valve holes 305 bored in a portion thereof adjacent to the stopper 304 such that the valve holes 305 communicate with a fluid passage extending axially. On the outer peripheral surface of the portion formed with the valve holes 305, there is formed a communication groove 305a along the whole circumference of the shaft 303.

A hollow cylindrical valve element 306 made of a non-magnetic material is arranged between the core 2 and the stopper 304 in a manner axially movable using the shaft 303 as a guide. A hollow cylindrical plunger 8 is fixedly fitted on the hollow cylindrical valve element 306 to perform axial motion together with the same. The hollow cylindrical valve element 306 has cutout portions 306a formed in an end thereof. When the proportional solenoid valve is not energized, the extreme end of the hollow cylindrical valve element 306 comes into contact with the flange of the stopper 304 to fully close the valve holes 305 and the communication groove 305a, whereas when the proportional solenoid valve is energized, the cutout portions 306a communicate with the communication groove 305. In short, the cutout portions 306a of the hollow cylindrical valve element 306 and the communication groove 305a of the shaft 303 form a mechanism similar to a spool valve.

Next, the operation of the proportional solenoid valve of the fourth embodiment will be described with reference to FIGS. 15 to 18.

Figure 15:
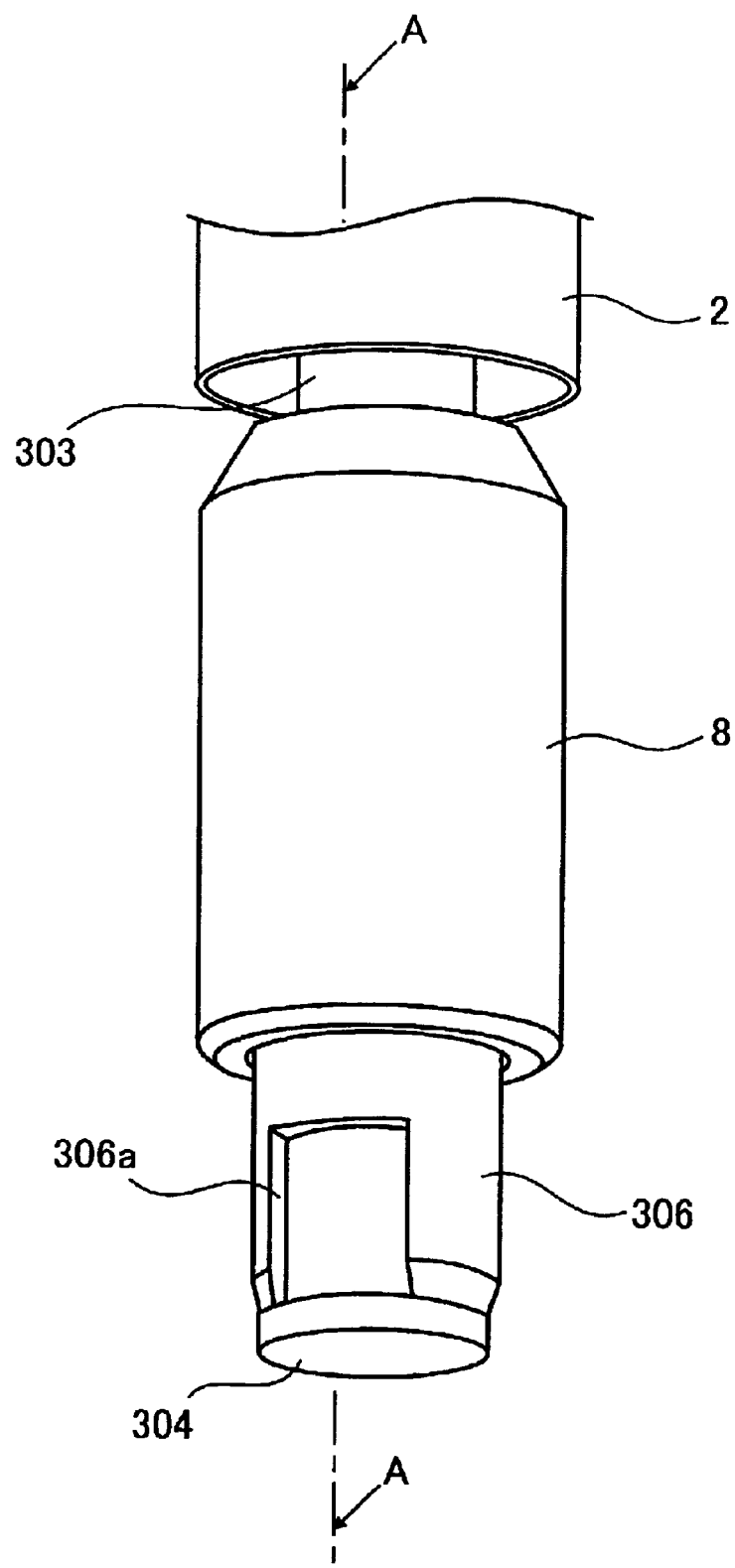
FIG. 15 is a perspective view showing a state of the inside of the proportional solenoid valve according to the fourth embodiment, in the non-energized state.
Figure 16:
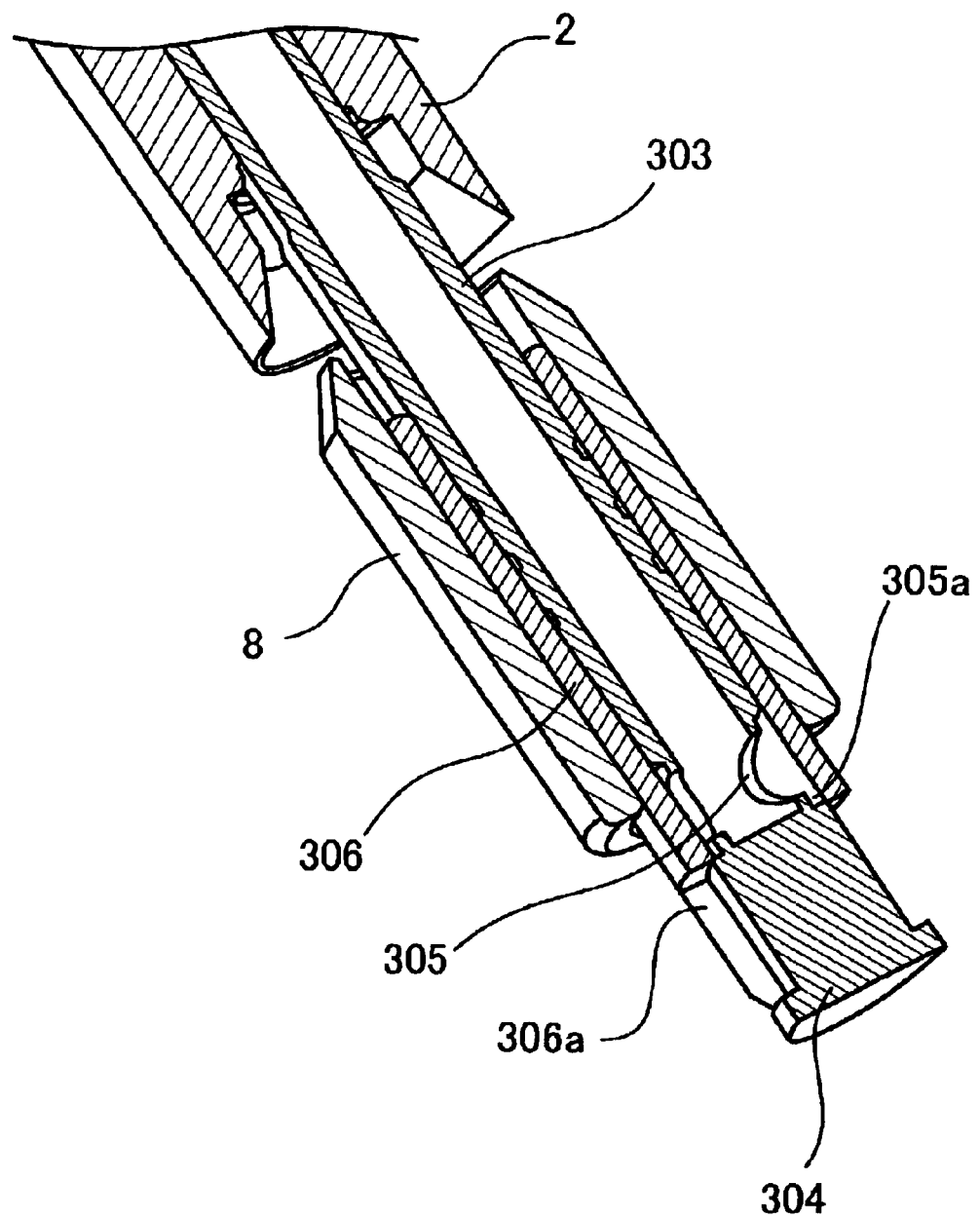
FIG. 16 is a cross-sectional view taken on line A—A of FIG. 15.
Figure 17:
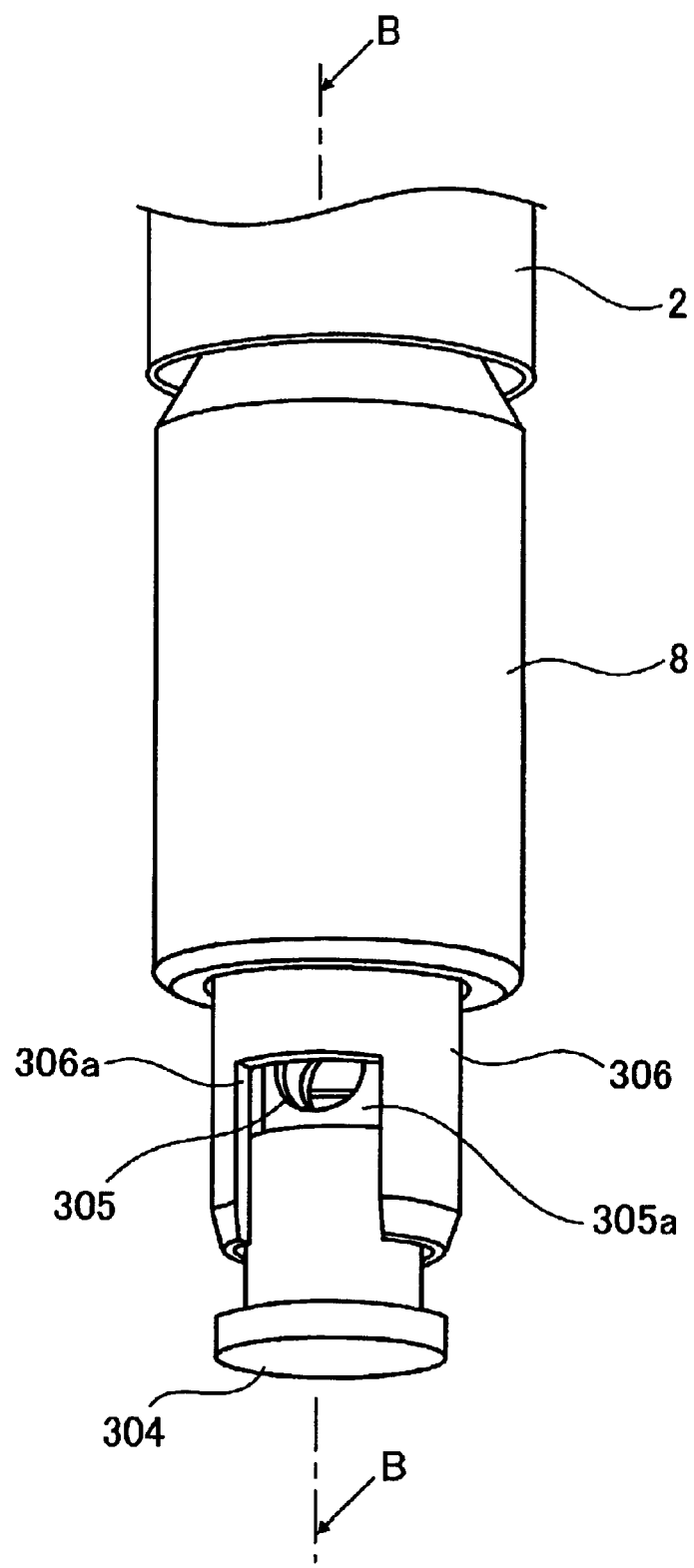
FIG. 17 is a perspective view showing a state of the inside of the proportional solenoid valve according to the fourth embodiment, in the energized state.
Figure 18:
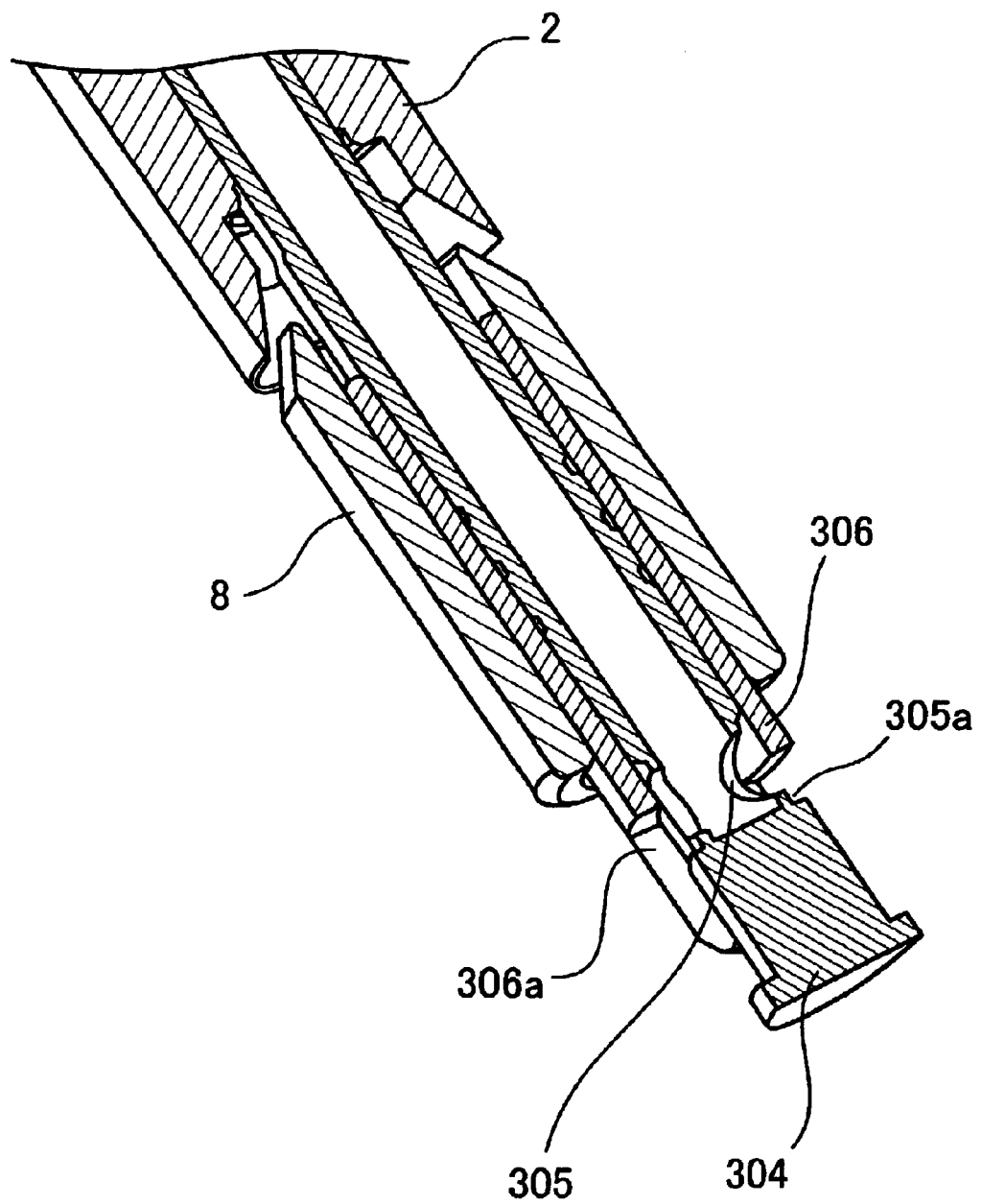
FIG. 18 is a cross-sectional view taken on line B—B of FIG. 17.

FIG. 15 is a perspective view showing essential parts of the proportional solenoid valve of the fourth embodiment in the non-energized state, and FIG. 16 is a cross-sectional view taken on line A—A of FIG. 15. FIG. 17 is a perspective view showing the essential parts of the proportional solenoid valve of the fourth embodiment in the energized state, and FIG. 18 is a cross-sectional view taken on line B—B of FIG. 17. In FIGS. 15 to 18, a washer and a spring are omitted from illustration.

In the non-energized state, as shown in FIGS. 15 and 16, the extreme end of the hollow cylindrical valve element 306 is held in contact with the flange of the stopper 304. In this state, the whole of each cutout portion 306a is positioned on a portion of the outer peripheral surface of the shaft 303, which is not formed with the communication groove 305a, and hence the valve holes 305 and the communication groove 305a are covered and fully closed by the inner wall of the hollow cylindrical valve element 306.

On the other hand, in the energized state, the hollow cylindrical valve element 306 and the plunger 8 are attracted by the core 2 and moved toward the same, as shown in FIGS. 17 and 18, whereby each of the cutout portions 306a partially overlaps the communication groove 305a, and hence the respective fluid passages from the both ends of the pipe 1 communicate with each other via the cutout portion 306a, the communication groove 305a and the valve holes 305.

The proportional solenoid valve of the fourth embodiment is suitable for controlling the flow rate of a high-pressure working fluid. Speaking of its application to the expansion valve of a refrigeration cycle, the proportional solenoid valve of the fourth embodiment is applicable to a system in which carbon dioxide whose operating pressure is high is used as refrigerant. On the other hand, the proportional solenoid valves of the first, second, and third embodiments are each applicable to a system in which an alternative fluorocarbon (HFC-134a) whose operating pressure is low is used as refrigerant.

The reason for this is that when refrigerant pressure is high, the difference between pressure of refrigerant from the communication groove before passing through a gap between the end face of the hollow cylindrical valve element and the tapered surface of the valve seat and pressure of the refrigerant after passing through the gap is increased to increase the velocity of refrigerant flow. This causes negative pressure to be generated around a flow of the refrigerant having passed through the space, and the negative pressure acts on the end face of the hollow cylindrical valve element to cause the movable hollow cylindrical valve element to be attracted toward the tapered surface of the fixed valve seat. Particularly when the valve lift is small, the velocity of the refrigerant flow is high, and hence the force attracting the hollow cylindrical valve element is large, which makes it difficult to control the valve lift. It should be noted that when refrigerant is flowing toward the communication groove and the valve holes through the gap between the end face of the hollow cylindrical valve element and the tapered surface of the valve seat, no such attractive force is generated, so that each of the proportional solenoid valves of the first to third embodiments can be applied to a cooling system which allows only unidirectional flow of refrigerant, even if the cooling system uses a refrigerant whose operating pressure is high.

Although in the proportional solenoid valve of the fourth embodiment, the hollow cylindrical valve element 306 having the cutout portions 306a for opening and closing the valve is arranged in the straight pipe 1, this is not limitative but it is also possible to arrange a hollow cylindrical valve element formed with cutout portions in a pipe having the shape shown in the second embodiment.

Although in the above description, the hollow cylindrical valve element made of a non-magnetic material is fixedly fitted in the plunger to perform axial motion together with the plunger, this is not limitative but e.g. when strainers are arranged at the respective open both ends of a proportional solenoid valve or within a system integrating the proportional solenoid valve, such that dirt can be removed from magnetic elements, the hollow cylindrical valve element can be made of a magnetic material.

Further, when the hollow cylindrical valve element is made of a magnetic material, it can be integrally formed with a plunger.

Figure 19:
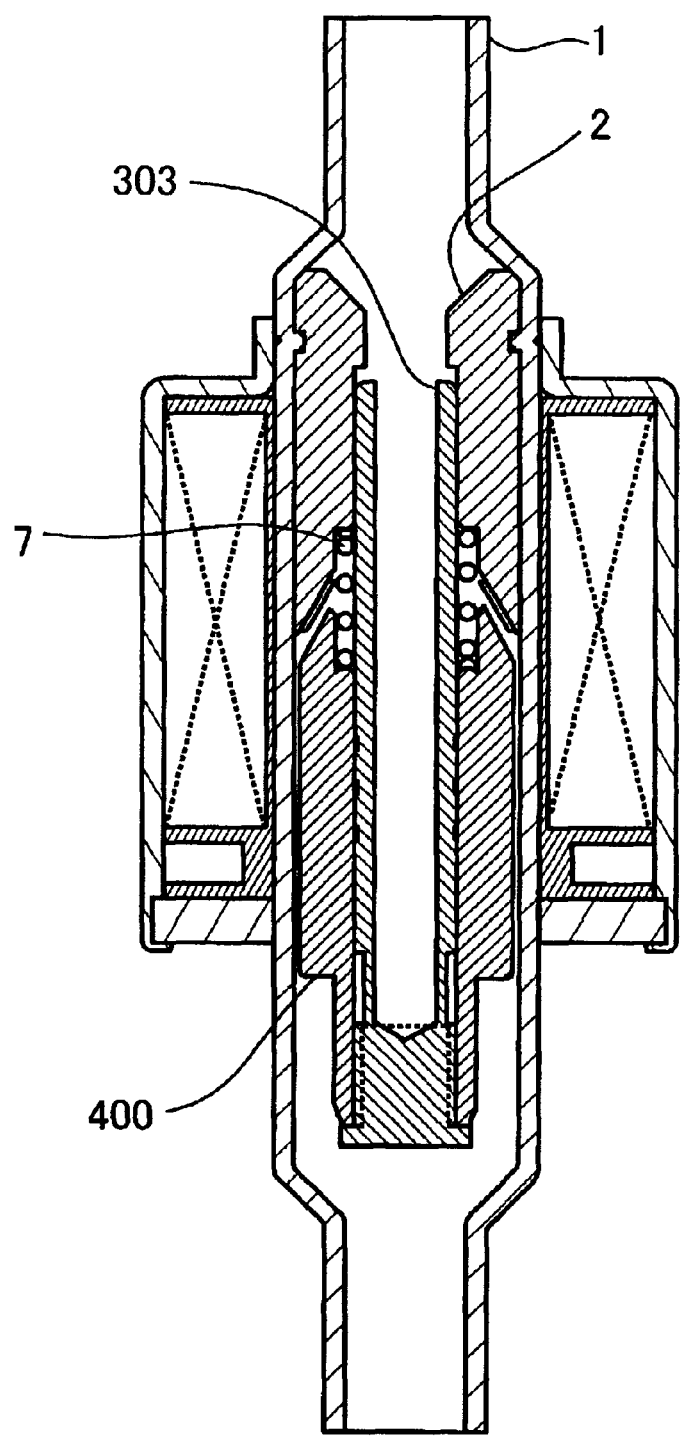
FIG. 19 is a central longitudinal cross-sectional view showing a proportional solenoid valve according to a fifth embodiment.

FIG. 19 is a central longitudinal cross-sectional view showing a proportional solenoid valve according to a fifth embodiment. The proportional solenoid valve of the fifth embodiment has a hollow cylindrical valve element integrally formed with a plunger. FIG. 19 shows a case in which the hollow cylindrical valve element 306 of the proportional solenoid valve of the fourth embodiment is integrally formed with the plunger 8.

A hollow cylindrical valve element and plunger 400 shown in FIG. 19 can axially move using a shaft 303 as a guide while maintaining a predetermined gap between the inner wall of a pipe 1 and the hollow cylindrical valve element and plunger 400 itself. More specifically, when the proportional solenoid valve is not energized, the hollow cylindrical valve element and plunger 400 is moved downward, as viewed in the figure, by a spring 7, whereas when an electric current is supplied, the hollow cylindrical valve element and plunger 400 is attracted toward a core 2 against the urging force of the spring 7. When the current value is changed, the hollow cylindrical valve element and plunger 400 is stopped at an axial position where the attractive force of the core 2 and the urging force of the spring 7 are balanced with each other depending on the current value. Thus, the proportional solenoid valve is set to a valve lift corresponding to the current value.

Although in the above embodiment, description has been given of the case where the hollow cylindrical valve element and the plunger are integrally formed with each other, by taking the proportional solenoid valve of the fourth embodiment as an example, it goes without saying that the construction can also be applied to the proportional solenoid valves of the first, second, and third embodiments.

Figure 20:
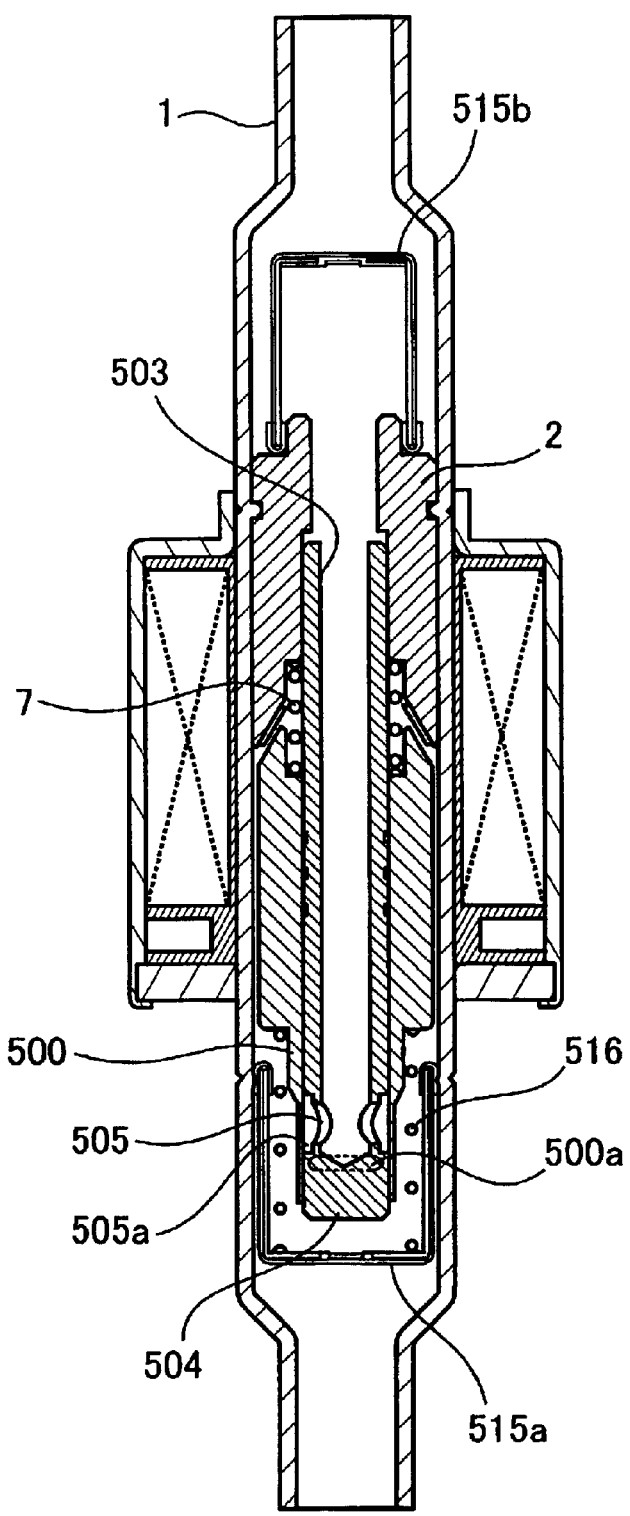
FIG. 20 is a central longitudinal cross-sectional view showing a proportional solenoid valve according to a sixth embodiment, in a non-energized state.
Figure 21:
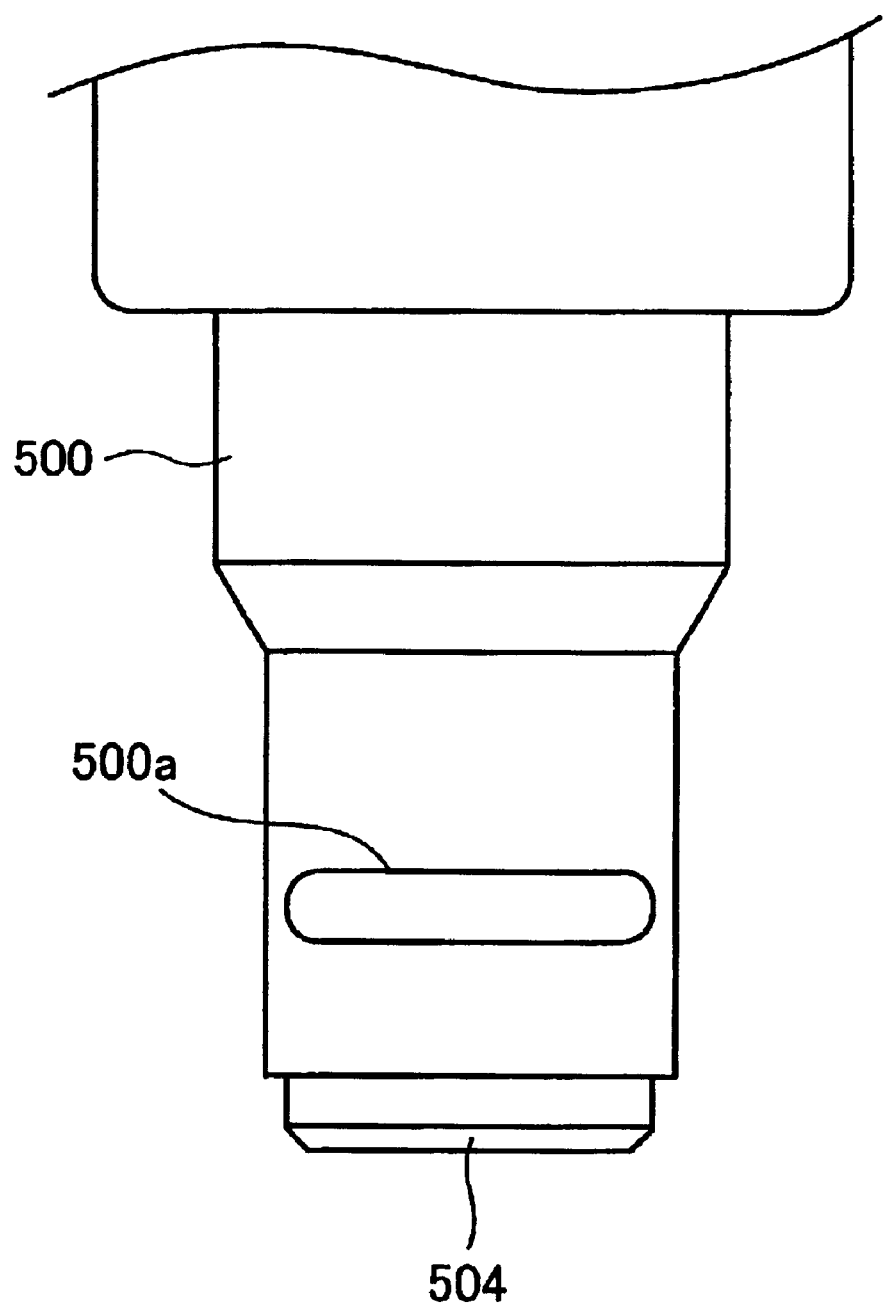
FIG. 21 is a perspective view showing a state of the inside of the proportional solenoid valve according to the sixth embodiment, in the non-energized state.
Figure 22:
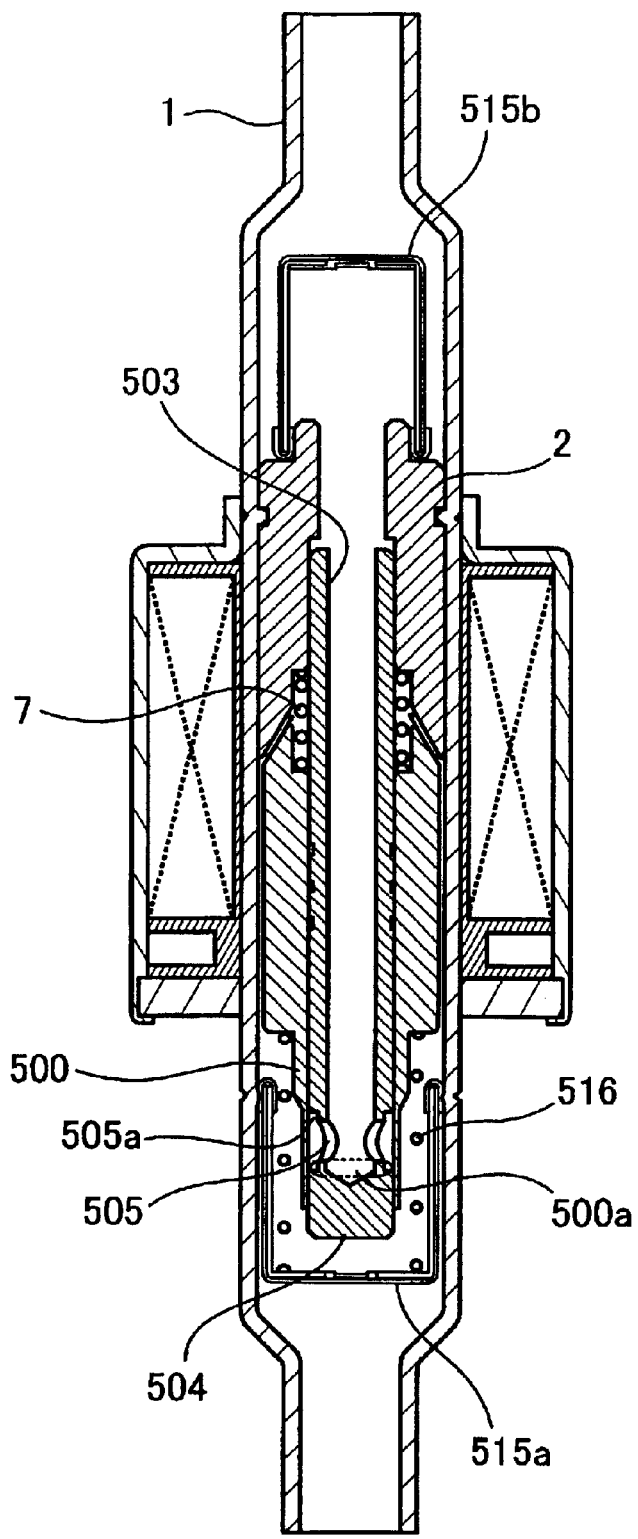
FIG. 22 is a central longitudinal cross-sectional view showing the proportional solenoid valve according to the sixth embodiment, in an energized state.
Figure 23:
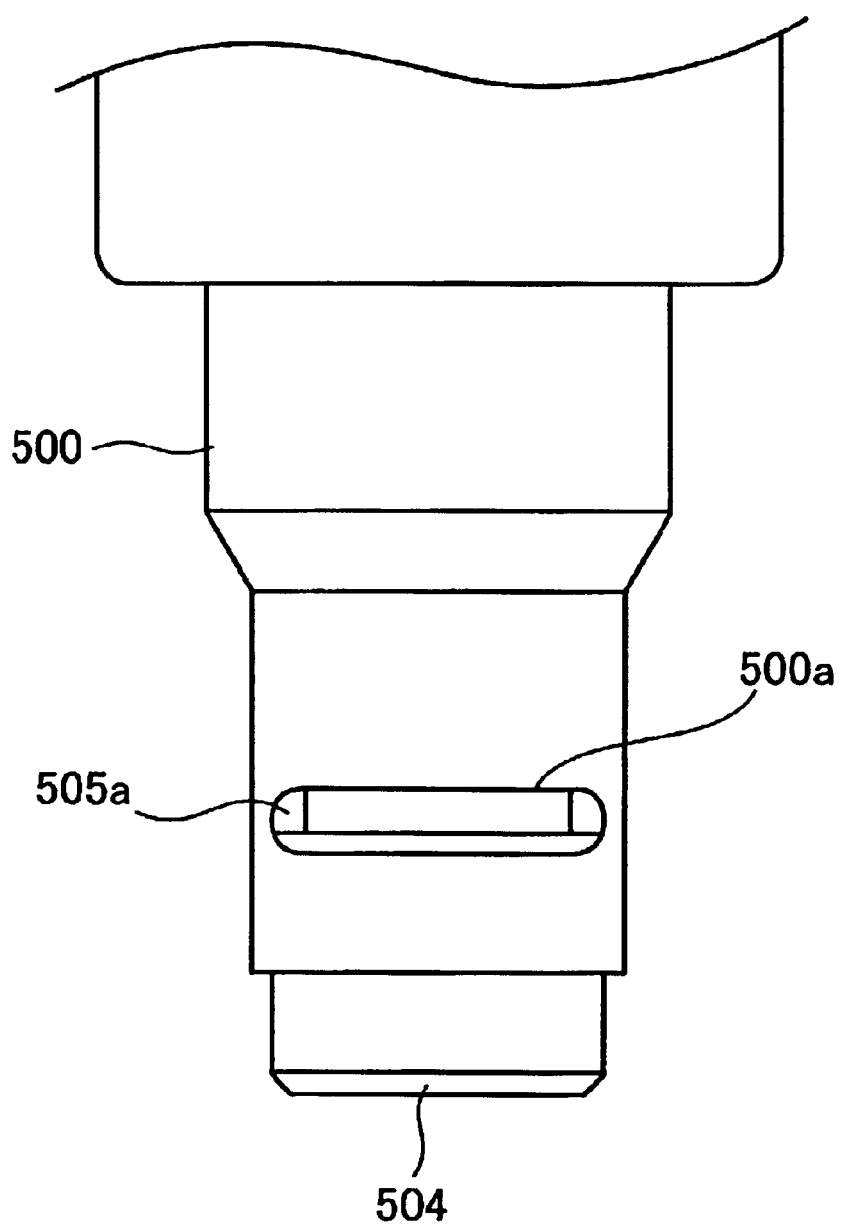
FIG. 23 is a perspective view showing a state of the inside of the proportional solenoid valve according to the sixth embodiment, in the energized state.

Next, a sixth embodiment will be described. FIG. 20 is a central longitudinal cross-sectional view showing a proportional solenoid valve of the sixth embodiment in a non-energized state, and FIG. 21 is a side view showing essential parts of the proportional solenoid valve of the sixth embodiment in the non-energized state. FIG. 22 is a central longitudinal cross-sectional view showing the proportional solenoid valve of the sixth embodiment in an energized state, and FIG. 23 is a side view showing the essential parts of the proportional solenoid valve of the sixth embodiment in the energized state. Component parts and elements in FIGS. 20 to 23 corresponding to those in FIGS. 1 and 2 are designated by identical reference numerals.

The proportional solenoid valve of the sixth embodiment has a hollow cylindrical valve element and plunger 500, which is formed by integrating a hollow cylindrical valve element and a plunger into one piece, arranged therein in a manner axially movable using a shaft 503 as a guide. The shaft 503 has a fluid passage extending axially therethrough, and one end of the shaft 503 is fitted in the fluid passage in the core 2. A closing portion 504 closing the axially extending fluid passage is integrally formed with the other end of the shaft 503, which is not fitted in the core 2. The shaft 503 has valve holes 505 bored in a portion thereof adjacent to the closing portion 504, such that the bores communicate with the axially extending fluid passage. In the outer peripheral surface of the portion formed with the valve holes 505, there is formed a communication groove 505a along the whole circumference of the shaft 503.

The proportional solenoid valve is provided with a strainer 515a fitted in the inner wall of a pipe 1 in a manner opposed to the closing portion 504 and a strainer 515b fitted on the core 2, so as to prevent dirt from entering the central portion of the valve.

The proportional solenoid valve has a second spring 516 for urging the hollow cylindrical valve element and plunger 500 toward the core 2. The second spring 516 utilizes the strainer 515a as a spring seat and prevents the hollow cylindrical valve element and plunger 500 from falling off the shaft 503.

For a reason described hereinbelow, the hollow cylindrical valve element and plunger 500 has an end formed to have a thinner tube thickness than the other portions, and the end of the hollow cylindrical valve element and plunger 500 is formed with a circumferentially elongated slot 500a.

According to the proportional solenoid valve of the sixth embodiment, when it is not energized, a first spring 7 and the second spring 516 are balanced with each other. In this state, the slot 500a formed in the end of the hollow cylindrical valve element and plunger 500 is positioned on the outer peripheral surface of the closing portion 504, and hence the valve holes 505 and the communication groove 505a are covered and fully closed by the inner wall of the hollow cylindrical valve element and plunger 500.

On the other hand, when the proportional solenoid valve is energized, the hollow cylindrical valve element and plunger 500 is attracted toward the core 2 and moved toward the same. As a result, the slot 500a partially overlaps the communication groove 505a, and the fluid passages from the respective both ends of the pipe 1 communicate with each other via the slot 500a, the communication groove 505a, and the valve holes 505.

In this case, when the pressure of a working fluid is high, negative pressure is generated around a flow of the fluid having passed through the slot 500a of the hollow cylindrical valve element and plunger 500 via the communication groove 505a, and an attractive force is generated to attract the hollow cylindrical valve element and plunger 500 toward the end of the closing portion 504. This attractive force is stronger as the inner surface of the slot 500a has a larger area. For this reason, in the proportional solenoid valve of the sixth embodiment, the end of the hollow cylindrical valve element and plunger 500 is formed to have the thin tube wall so as to reduce the area of the inner surface of the slot 500a bored therein, thereby suppressing the influence of the attractive force.

Further, in the proportional solenoid valve of the sixth embodiment, it is possible to increase the respective spring constants of the first and second springs 7 and 516 for urging the hollow cylindrical valve element and plunger 500 from the both sides, to make the hollow cylindrical valve element and plunger 500 less movable, thereby reducing the influence of the attractive force attracting the hollow cylindrical valve element and plunger 500 toward the end of the closing portion 504.

Thus, by setting the respective spring constants of the first and second springs 7 and 516 properly according to the size of the hollow cylindrical valve element and plunger 500 of the proportional solenoid valve, it is possible to prevent the communication groove 505a and the valve holes 505 from being closed due to attraction of the hollow cylindrical valve element and plunger 500 toward the end of the closing portion 504.

Figure 24:
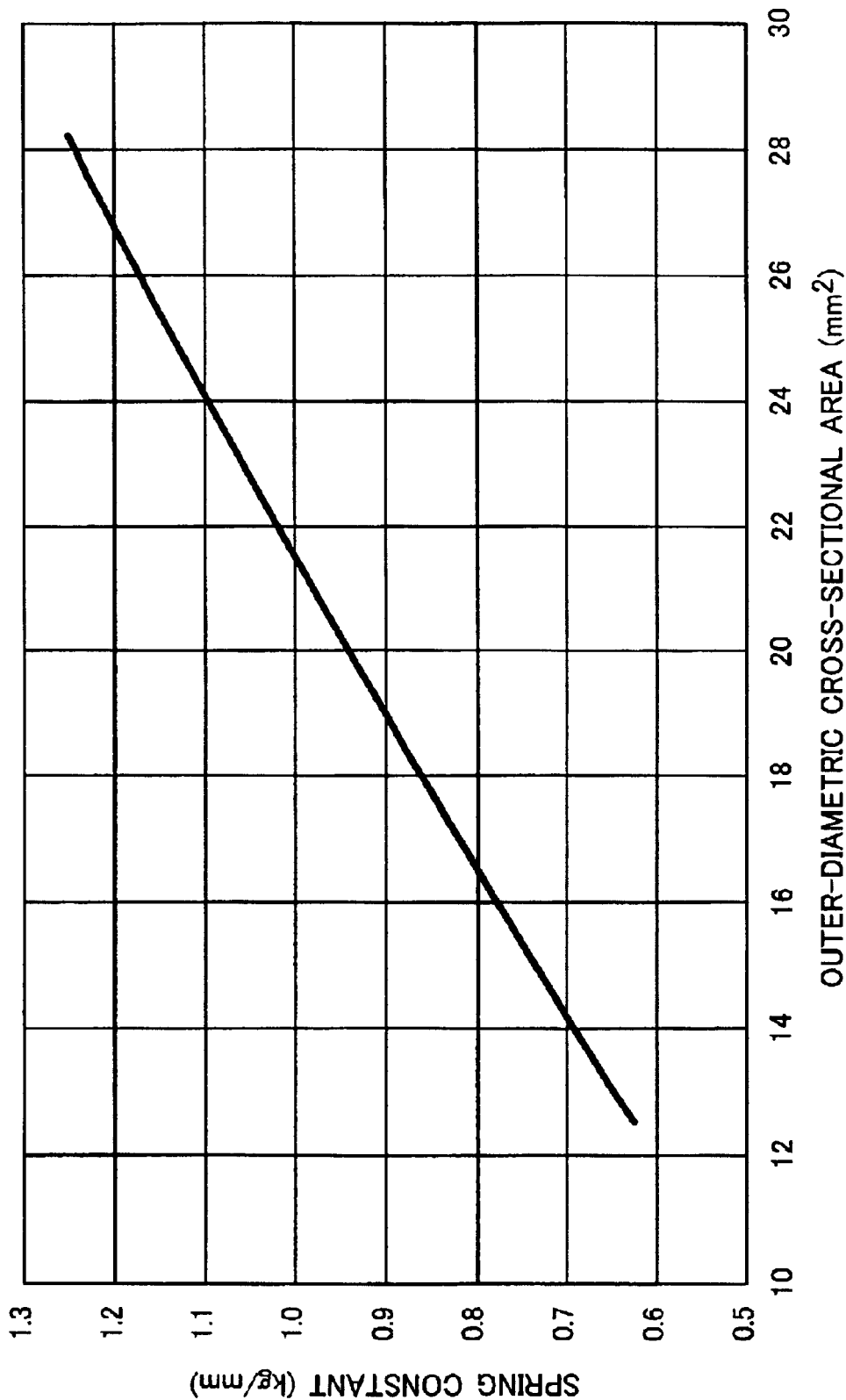
FIG. 24 is a graph showing the relationship between an outer-diametric cross-sectional area of an end of a hollow cylindrical valve element and plunger and a spring constant.

FIG. 24 is a graph showing the relationship between the outer-diametric cross-sectional area (in other words, the area of the circle which makes an outer diameter a diameter) of the end of the hollow cylindrical valve element and plunger 500 and the spring constant. The abscissa in FIG. 24 represents the value of the outer-diametric cross-sectional area of the end of the hollow cylindrical valve element and plunger 500 which is proportional to the end area of the hollow cylindrical valve element and plunger 500, while the ordinate represents the value of the spring constant of the first and second springs 7 and 516 for urging the hollow cylindrical valve element and plunger 500 from the respective both sides. The spring constant here represents the sum of the spring constant of the first spring 7 and that of the second spring 516.

In FIG. 24, points substantially free of the influence of the attractive force of fluid which are found in the relationship between the outer-diametric cross-sectional area of the end of the hollow cylindrical valve element and plunger 500 and the spring constant of the first spring 7 and the second spring 516 are plotted as a line. This line indicates that the ratio of the spring constant to the outer-diametric cross-sectional area of the hollow cylindrical valve element and plunger 500 (spring constant/outer-diametric cross-sectional area) is 0.05.

More specifically, when the ratio of the spring constant of the first spring 7 and the second spring 516 to the outer-diametric cross-sectional area of the hollow cylindrical valve element and plunger 500 becomes equal to or larger than 0.05, the hollow cylindrical valve element and plunger 500 is made less movable by an increase in the spring constant, so that the attractive force of fluid which passes through the slot 500a via the communication groove 505a can be practically ignored.

On the other hand, when the ratio of the spring constant to the outer-diametric cross-sectional area is smaller than 0.05, the hollow cylindrical valve element and plunger 500 become more easily movable, and hence is affected by the attractive force of the fluid.

Therefore, by setting the ratio of the spring constant of the first spring 7 and the second spring 516 to the outer-diametric cross-sectional area of the hollow cylindrical valve element and plunger 500 to 0.05 or more, it is possible to positively prevent the hollow cylindrical valve element and plunger 500 from being moved by the attractive force of the fluid.

Figure 25:
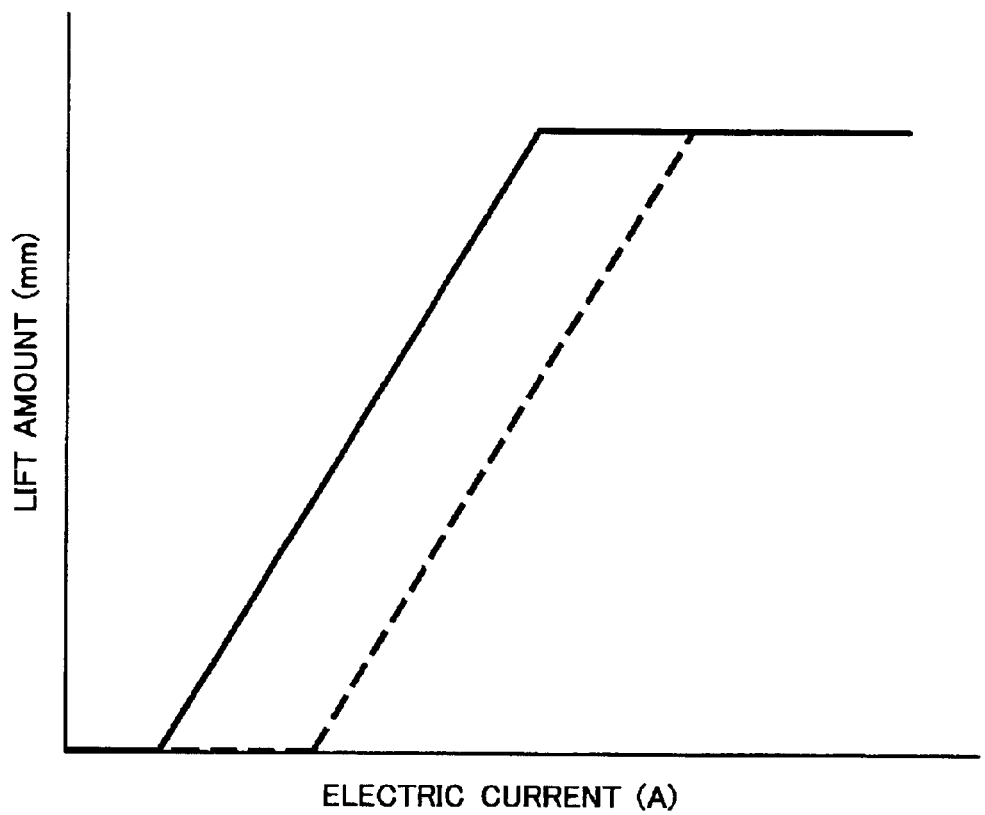
FIG. 25 is a diagram schematically showing a current-lift characteristic of the proportional solenoid valve according to the sixth embodiment.

FIG. 25 is a diagram schematically showing the current-lift characteristic of the proportional solenoid valve of the sixth embodiment. In FIG. 25, the abscissa represents electric current supplied to the solenoid coil 10, while the ordinate represents the amount of valve lift of the hollow cylindrical valve element and plunger 500 toward the core 2. In FIG. 25, changes in the lift amount occurring as the value of the electric current supplied to the solenoid coil 10 is increased are schematically represented by a solid line. Further, for comparison, the current-lift characteristic of a proportional solenoid valve having a single spring is schematically shown by a dotted line.

The proportional solenoid valve of the sixth embodiment has the two springs for urging the hollow cylindrical valve element and plunger 500 from the respective both sides, and when the proportional solenoid valve is not energized, the communication groove 505a and the valve holes 505 are closed by the hollow cylindrical valve element and plunger 500 in a state of the springs being balanced with each other, whereby the proportional solenoid valve is held in the valve closed state.

When the solenoid coil 10 is energized in this state, the hollow cylindrical valve element and plunger 500 is immediately moved toward the core 2. Actually, however, since there occurs friction between the hollow cylindrical valve element and plunger 500 and the shaft 503 as a guide, the hollow cylindrical valve element and plunger 500 starts moving toward the core 2 only after the electric current supplied to the core 2 exceeds a predetermined value. Compared with the proportional solenoid valve having the single spring, in which a hollow cylindrical valve element and plunger requires a magnetic attractive force stronger than the urging force of the spring to start moving, the proportional solenoid valve of the sixth embodiment is capable of causing the hollow cylindrical valve element and plunger 500 to start moving with a smaller electric current.

It should be noted that the piping joints described in the third embodiment can also be mounted to the open ends of each of the proportional solenoid valves according to the fourth, fifth, and sixth embodiments.

As described above, according to the present invention, the body of the proportional solenoid valve is formed by a hollow cylindrical pipe, and within the pipe, there are arranged the shaft formed with the valve holes for communication between the open ends of the pipe, and the hollow cylindrical valve element fixedly fitted in the plunger, for axially moving using the shaft as a guide to open and close the valve holes, while outside the pipe, there is arranged the solenoid coil. According to this construction, since the component parts for opening and closing the valve are arranged within the pipe, it is possible to reduce the number of component parts and the size of the proportional solenoid valve, which contributes to reduction of manufacturing costs including machining costs and material costs.

Further, since the hollow cylindrical valve element has a construction which prevents fluid pressure from adversely affecting the operation thereof, the proportional solenoid valve of the invention is capable of controlling a flow rate of bidirectional flow of a fluid, which makes it possible to widely use the proportional solenoid valve in various systems.

Furthermore, by forming the hollow cylindrical valve element arranged within the pipe by using a non-magnetic material, it is possible to prevent dirt of magnetic materials from being deposited on the hollow cylindrical valve element, thereby improving sealability and durability of the proportional solenoid valve.

Moreover, since the springs for urging the hollow cylindrical valve element in the valve opening direction and in the valve closing direction, respectively, are provided, it is possible to carry out valve opening operation with a small electric current and at the same time maintain communication between the opposite ends of the pipe reliably.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A proportional solenoid valve for changing a valve lift continuously according to a value of an electric current supplied to a solenoid coil,
characterized by comprising:
a core fixed in a hollow cylindrical pipe;
a partially hollow shaft having one end thereof fixed in the core axially of the pipe and another end thereof bored with a plurality of valve holes on a circumference thereof such that the bores communicate with a fluid passage extending axially of the pipe;
a hollow cylindrical valve element arranged in a manner axially movable using the shaft as a guide so as to open and close the valve holes;
a first spring arranged between the core and the hollow cylindrical valve element, for urging the hollow cylindrical valve element in a direction away from the core;
a hollow cylindrical plunger fixedly fitted on the hollow cylindrical valve element; and
a solenoid coil circumferentially provided on an outside of the pipe.

2. The proportional solenoid valve according to claim 1, wherein the pipe is a straight pipe, and the fluid passage within the shaft, which communicates with the valve holes, extends to a core-side extreme end of the shaft and further communicates with a passage formed through the core axially thereof.

3. The proportional solenoid valve according to claim 1, wherein the pipe has a shape formed by joining a second pipe perpendicularly to a straight first pipe, the first pipe having one end thereof closed by the core, and the fluid passage within the shaft, which communicates with the valve holes, extending to an extreme end of the another end of the shaft, an outer peripheral surface of the shaft close to the extreme end of the another end being in intimate contact with an inner wall surface of the first pipe.

4. The proportional solenoid valve according to claim 3, wherein the solenoid coil is removable from the first pipe and the core.

5. The proportional solenoid valve according to claim 1, wherein the shaft has a communication groove formed along a whole circumference thereof in an outer peripheral surface of a portion thereof formed with the valve holes.

6. The proportional solenoid valve according to claim 1, wherein a portion of the shaft with which the hollow cylindrical valve element is brought into abutment by being urged by the first spring is formed into a conical shape to provide a tapered valve seat.

7. The proportional solenoid valve according to claim 1, wherein a portion of the shaft with which the hollow cylindrical valve element is brought into abutment by being urged by the first spring is formed as a flange projecting radially outward.

8. The proportional solenoid valve according to claim 7, wherein the hollow cylindrical valve element has a plurality of cutout portions formed in a flange-side end thereof, the cutout portions fully closing the valve holes when the hollow cylindrical valve element is in contact with the flange, and communicating with the valve holes when the hollow cylindrical valve element is moved toward the core by energization of the solenoid coil.

9. The proportional solenoid valve according to claim 1, comprising a second spring for urging the hollow cylindrical valve element and the plunger toward the core.

10. The proportional solenoid valve according to claim 9, wherein the hollow cylindrical valve element is formed with a circumferentially elongated slot which fully closes the valve holes when the first spring and the second spring are balanced with each other, and communicates with the valve holes when the hollow cylindrical valve element is moved toward the core by energization of the solenoid coil.

11. The proportional solenoid valve according to claim 9, wherein the hollow cylindrical valve element has an end portion thereof formed to have a reduced thickness, the end portion including a portion formed with the slot.

12. The proportional solenoid valve according to claim 11, wherein a ratio of a sum of a spring constant of the first spring and a spring constant of the second spring to an outer-diametric cross-sectional area of a valve seat-side end portion of the hollow cylindrical valve element is equal to or larger than 0.05.

13. The proportional solenoid valve according to claim 1, wherein the plunger has an outer diameter which produces a predetermined gap between an inner wall of the pipe and the plunger itself.

14. The proportional solenoid valve according to claim 1, wherein the core and the plunger have respective end faces opposed to each other, the end faces being formed to have respective tapered surfaces sloped with identical gradients.

15. The proportional solenoid valve according to claim 1, wherein the hollow cylindrical valve element is made of a non-magnetic material.

16. The proportional solenoid valve according to claim 1, wherein the shaft has at least one groove circumferentially formed in a sliding surface thereof on which the hollow cylindrical valve element slides.

17. The proportional solenoid valve according to claim 1, wherein the pipe has open ends thereof each drawn in a manner adapted to a diameter of a mating pipe for welding.

18. The proportional solenoid valve according to claim 1, wherein the hollow cylindrical valve element is integrally formed with the plunger.

19. The proportional solenoid valve according to claim 1, wherein the shaft is fixed to the core by press-fitting, and a flow characteristic is adjusted by changing an amount of press-fitting.

20. The proportional solenoid valve according to claim 1, wherein the pipe has piping joints attached to open ends thereof.

\* \* \* \* \*